US012496080B2

(12) United States Patent
Kelly et al.

(10) Patent No.: US 12,496,080 B2
(45) Date of Patent: Dec. 16, 2025

(54) SUPER-BORE CATHETER WITH BRAID SUPPORTED FLARED TIP

(71) Applicant: Neuravi Limited, Galway (IE)

(72) Inventors: Ronald Kelly, Galway (IE); Karl Keating, Galway (IE); David Vale, Galway (IE); Brendan Casey, Galway (IE)

(73) Assignee: NEURAVI LIMITED, Galway (IE)

( * ) Notice: Subject to any disclaimer, the term of this patent is extended or adjusted under 35 U.S.C. 154(b) by 0 days.

(21) Appl. No.: 17/518,428

(22) Filed: Nov. 3, 2021

(65) Prior Publication Data

US 2023/0137418 A1 May 4, 2023

(51) Int. Cl.
*A61B 17/221* (2006.01)
*A61B 17/00* (2006.01)
(Continued)

(52) U.S. Cl.
CPC .. *A61B 17/221* (2013.01); *A61B 2017/00336* (2013.01); *A61B 2017/00526* (2013.01);
(Continued)

(58) Field of Classification Search
CPC ........ A61B 17/221; A61B 2017/00336; A61B 2017/00526; A61B 2017/00942;
(Continued)

(56) References Cited

U.S. PATENT DOCUMENTS

| 4,148,319 A | 4/1979 | Kasper et al. |
| 4,243,040 A | 1/1981 | Beecher |

(Continued)

FOREIGN PATENT DOCUMENTS

| AU | 2015271876 B2 | 9/2017 |
| CN | 1658920 A | 8/2005 |

(Continued)

OTHER PUBLICATIONS

US 6,348,062 B1, 02/2002, Hopkins (withdrawn)
(Continued)

*Primary Examiner* — Tan-Uyen T Ho
*Assistant Examiner* — Osama Nemer
(74) *Attorney, Agent, or Firm* — Troutman Pepper Locke LLP

(57) ABSTRACT

A clot retrieval catheter with a large bore shaft and a distal braid-supported tip that is expandable to a diameter larger than the outer sheath through which it is delivered is described herein. The shaft can have a plurality of supporting braids fixed distally to a radiopaque marker band. The tip can have another plurality of supporting braids fixed proximally to the marker band and a decreasing braid angle distally so that the tip can be heat set to an expanded funnel shape. The wires of the tip braids can follow one spiral direction distally and then invert proximally back on themselves to form the other spiral direction of the braid. This inversion of the wires results in atraumatic distal hoops at the distal termination of the braid. Designs can further have spines capable of resisting elongation of the catheter shaft during a procedure.

18 Claims, 16 Drawing Sheets

(51) Int. Cl.
*A61M 25/00* (2006.01)
*A61M 25/06* (2006.01)

(52) U.S. Cl.
CPC .............. *A61B 2017/00942* (2013.01); *A61B 2017/2215* (2013.01); *A61M 25/001* (2013.01); *A61M 25/0045* (2013.01); *A61M 2025/0681* (2013.01)

(58) Field of Classification Search
CPC .. A61B 2017/2215; A61B 2017/22038; A61B 2017/22094; A61B 2017/2212; A61B 2017/22079; A61L 29/04; A61M 25/0012; A61M 25/0053; A61M 25/0082; A61M 2025/0008; A61M 2025/0096
See application file for complete search history.

(56) References Cited

U.S. PATENT DOCUMENTS

| | | |
|---|---|---|
| 4,324,262 A | 4/1982 | Hall |
| 4,351,342 A | 9/1982 | Wiita et al. |
| 4,575,371 A | 3/1986 | Nordqvist et al. |
| 4,592,356 A | 6/1986 | Gutierrez |
| 4,719,924 A | 1/1988 | Crittenden et al. |
| 4,738,666 A | 4/1988 | Fuqua |
| 4,767,404 A | 8/1988 | Renton |
| 4,793,348 A | 12/1988 | Palmaz |
| 4,822,338 A | 4/1989 | Longmore et al. |
| 4,873,978 A | 10/1989 | Ginsburg |
| 5,011,488 A | 4/1991 | Ginsburg |
| 5,057,092 A | 10/1991 | Webster, Jr. |
| 5,092,839 A | 3/1992 | Kipperman |
| 5,102,415 A | 4/1992 | Guenther et al. |
| 5,106,364 A | 4/1992 | Hayafuji et al. |
| 5,122,136 A | 6/1992 | Guglielmi et al. |
| 5,123,840 A | 6/1992 | Nates |
| 5,171,233 A | 12/1992 | Amplatz |
| 5,176,660 A | 1/1993 | Truckai |
| 5,234,437 A | 8/1993 | Sepetka |
| 5,256,144 A | 10/1993 | Kraus et al. |
| 5,261,916 A | 11/1993 | Engelson |
| 5,337,754 A * | 8/1994 | Heaven .............. A61B 17/0218 600/562 |
| 5,370,647 A | 12/1994 | Graber et al. |
| 5,372,124 A | 12/1994 | Takayama et al. |
| 5,385,562 A | 1/1995 | Adams |
| 5,387,219 A | 2/1995 | Rappe |
| 5,387,226 A | 2/1995 | Miraki |
| 5,396,902 A | 3/1995 | Brennen et al. |
| 5,447,497 A | 9/1995 | Sogard et al. |
| 5,449,372 A | 9/1995 | Schmaltz |
| 5,520,651 A | 5/1996 | Sutcu |
| 5,538,008 A | 7/1996 | Crowe |
| 5,538,512 A | 7/1996 | Zenzon et al. |
| 5,549,626 A | 8/1996 | Miller et al. |
| 5,558,652 A | 9/1996 | Henke |
| 5,601,600 A | 2/1997 | Ton |
| 5,609,627 A | 3/1997 | Goicoechea et al. |
| 5,624,461 A | 4/1997 | Mariant |
| 5,639,277 A | 6/1997 | Mariant |
| 5,645,558 A | 7/1997 | Horton |
| 5,658,296 A | 8/1997 | Bates |
| 5,662,671 A | 9/1997 | Barbut |
| 5,695,519 A | 12/1997 | Summers et al. |
| 5,702,373 A | 12/1997 | Samson |
| 5,709,704 A | 1/1998 | Nott et al. |
| 5,713,853 A | 2/1998 | Clark |
| 5,728,078 A | 3/1998 | Powers, Jr. |
| 5,769,871 A | 6/1998 | Mers Kelly |
| 5,779,716 A | 7/1998 | Cano |
| 5,797,948 A | 8/1998 | Dunham |
| 5,810,874 A | 9/1998 | Lefebvre |
| 5,814,064 A | 9/1998 | Daniel et al. |
| 5,827,304 A | 10/1998 | Hart |
| 5,846,248 A | 12/1998 | Chu et al. |
| 5,846,251 A | 12/1998 | Hart |
| 5,855,598 A | 1/1999 | Pinchuk |
| 5,893,869 A | 4/1999 | Barnhart et al. |
| 5,895,398 A | 4/1999 | Wensel |
| 5,897,567 A | 4/1999 | Ressemann |
| 5,904,698 A | 5/1999 | Thomas et al. |
| 5,911,715 A | 6/1999 | Berg et al. |
| 5,911,725 A | 6/1999 | Boury |
| 5,935,139 A | 8/1999 | Bates |
| 5,938,645 A | 8/1999 | Gordon |
| 5,947,995 A | 9/1999 | Samuels |
| 5,951,539 A | 9/1999 | Nita et al. |
| 5,968,057 A | 10/1999 | Taheri |
| 5,971,938 A | 10/1999 | Hart et al. |
| 5,997,939 A | 12/1999 | Moechnig et al. |
| 6,022,343 A | 2/2000 | Johnson et al. |
| 6,063,113 A | 5/2000 | Kavteladze |
| 6,066,149 A | 5/2000 | Samson et al. |
| 6,066,158 A | 5/2000 | Engelson |
| 6,093,196 A | 7/2000 | Okada |
| 6,093,199 A | 7/2000 | Brown et al. |
| 6,096,053 A | 8/2000 | Bates |
| 6,099,534 A | 8/2000 | Bates |
| 6,102,932 A | 8/2000 | Kurz |
| 6,106,548 A | 8/2000 | Roubin et al. |
| 6,120,534 A | 9/2000 | Ruiz |
| 6,129,739 A | 10/2000 | Khosravi |
| 6,142,957 A | 11/2000 | Diamond et al. |
| 6,146,396 A | 11/2000 | Kónya et al. |
| 6,146,404 A | 11/2000 | Kim |
| 6,165,194 A | 12/2000 | Denardo |
| 6,165,199 A | 12/2000 | Barbut |
| 6,168,604 B1 | 1/2001 | Cano |
| 6,168,622 B1 | 1/2001 | Mazzocchi |
| 6,174,318 B1 | 1/2001 | Bates et al. |
| 6,179,861 B1 | 1/2001 | Khosravi |
| 6,203,561 B1 | 3/2001 | Ramee |
| 6,214,026 B1 | 4/2001 | Lepak |
| 6,214,036 B1 | 4/2001 | Letendre et al. |
| 6,221,006 B1 | 4/2001 | Dubrul |
| 6,238,412 B1 | 5/2001 | Dubrul |
| 6,245,087 B1 | 6/2001 | Addis |
| 6,251,122 B1 | 6/2001 | Tsukernik |
| 6,254,571 B1 | 7/2001 | Hart |
| 6,264,663 B1 | 7/2001 | Cano |
| 6,306,163 B1 | 10/2001 | Fitz |
| 6,309,379 B1 | 10/2001 | Willard |
| 6,312,407 B1 | 11/2001 | Zadno-Azizi et al. |
| 6,312,444 B1 | 11/2001 | Barbut |
| 6,315,778 B1 | 11/2001 | Gambale et al. |
| 6,323,459 B1 | 11/2001 | Maynard |
| 6,325,819 B1 | 12/2001 | Pavcnik et al. |
| 6,334,864 B1 | 1/2002 | Amplatz et al. |
| 6,336,934 B1 | 1/2002 | Gilson et al. |
| 6,346,116 B1 | 2/2002 | Brooks et al. |
| 6,348,056 B1 | 2/2002 | Bates |
| 6,350,271 B1 | 2/2002 | Kurz et al. |
| 6,358,238 B1 * | 3/2002 | Sherry ................ A61M 25/005 604/524 |
| 6,361,545 B1 | 3/2002 | Macoviak |
| 6,371,963 B1 | 4/2002 | Nishtala et al. |
| 6,375,668 B1 | 4/2002 | Gifford et al. |
| 6,383,205 B1 | 5/2002 | Samson et al. |
| 6,383,206 B1 | 5/2002 | Gillick |
| 6,391,037 B1 | 5/2002 | Greenhalgh |
| 6,402,771 B1 | 6/2002 | Palmer |
| 6,409,683 B1 | 6/2002 | Fonseca et al. |
| 6,416,541 B2 | 7/2002 | Denardo |
| 6,425,909 B1 | 7/2002 | Dieck et al. |
| 6,432,122 B1 | 8/2002 | Gilson et al. |
| 6,436,112 B2 | 8/2002 | Wensel |
| 6,458,139 B1 | 10/2002 | Palmer |
| 6,485,497 B2 | 11/2002 | Wensel |
| 6,485,501 B1 | 11/2002 | Green |
| 6,485,502 B2 | 11/2002 | Don Michael |
| 6,511,492 B1 | 1/2003 | Rosenbluth |
| 6,517,551 B1 | 2/2003 | Driskill |
| 6,520,934 B1 | 2/2003 | Lee et al. |

(56) References Cited

U.S. PATENT DOCUMENTS

| | | | |
|---|---|---|---|
| 6,520,951 B1 | 2/2003 | Carrillo, Jr. et al. | |
| 6,530,935 B2 | 3/2003 | Wensel | |
| 6,530,939 B1 | 3/2003 | Hopkins | |
| 6,540,768 B1 | 4/2003 | Diaz et al. | |
| 6,544,279 B1 | 4/2003 | Hopkins | |
| 6,551,341 B2 | 4/2003 | Boylan et al. | |
| 6,551,342 B1 | 4/2003 | Shen et al. | |
| 6,575,997 B1 | 6/2003 | Palmer et al. | |
| 6,582,448 B1 | 6/2003 | Boyle | |
| 6,585,756 B1 | 7/2003 | Strecker | |
| 6,589,265 B1 | 7/2003 | Palmer et al. | |
| 6,592,607 B1 | 7/2003 | Palmer et al. | |
| 6,592,616 B1 | 7/2003 | Stack | |
| 6,602,265 B2 * | 8/2003 | Dubrul | A61B 17/221 606/159 |
| 6,602,271 B2 | 8/2003 | Adams | |
| 6,602,272 B2 | 8/2003 | Boylan et al. | |
| 6,605,102 B1 | 8/2003 | Mazzocchi et al. | |
| 6,610,077 B1 | 8/2003 | Hancock et al. | |
| 6,616,679 B1 | 9/2003 | Khosravi | |
| 6,632,241 B1 | 10/2003 | Hancock et al. | |
| 6,638,245 B2 | 10/2003 | Miller | |
| 6,638,293 B1 | 10/2003 | Makower et al. | |
| 6,641,590 B1 | 11/2003 | Palmer et al. | |
| 6,652,555 B1 | 11/2003 | VanTassel et al. | |
| 6,656,218 B1 | 12/2003 | Denardo et al. | |
| 6,660,021 B1 | 12/2003 | Palmer et al. | |
| 6,663,650 B2 | 12/2003 | Sepetka | |
| 6,673,089 B1 | 1/2004 | Yassour et al. | |
| 6,685,722 B1 | 2/2004 | Rosenbluth | |
| 6,692,504 B2 | 2/2004 | Kurz et al. | |
| 6,692,508 B2 | 2/2004 | Wensel | |
| 6,692,509 B2 | 2/2004 | Wensel | |
| 6,695,858 B1 * | 2/2004 | Dubrul | A61B 17/221 606/159 |
| 6,702,782 B2 | 3/2004 | Miller | |
| 6,709,429 B1 | 3/2004 | Schaefer et al. | |
| 6,712,834 B2 | 3/2004 | Yassour et al. | |
| 6,726,701 B2 | 4/2004 | Gilson et al. | |
| 6,726,703 B2 | 4/2004 | Broome et al. | |
| 6,730,104 B1 | 5/2004 | Sepetka | |
| 6,755,779 B2 * | 6/2004 | Vanden Hoek | A61F 2/2481 606/112 |
| 6,824,545 B2 | 11/2004 | Sepetka | |
| 6,855,155 B2 | 2/2005 | Denardo et al. | |
| 6,878,163 B2 | 4/2005 | Denardo et al. | |
| 6,890,340 B2 | 5/2005 | Duane | |
| 6,913,612 B2 | 7/2005 | Palmer | |
| 6,913,618 B2 | 7/2005 | Denardo et al. | |
| 6,953,472 B2 | 10/2005 | Palmer et al. | |
| 6,989,019 B2 | 1/2006 | Mazzocchi | |
| 6,989,021 B2 | 1/2006 | Bosma et al. | |
| 6,994,718 B2 | 2/2006 | Groothuis et al. | |
| 6,997,939 B2 | 2/2006 | Linder | |
| 7,004,954 B1 | 2/2006 | Voss et al. | |
| 7,004,955 B2 | 2/2006 | Shen | |
| 7,004,956 B2 | 2/2006 | Palmer | |
| 7,008,434 B2 | 3/2006 | Kurz et al. | |
| 7,033,376 B2 | 4/2006 | Tsukernik | |
| 7,041,116 B2 | 5/2006 | Goto | |
| 7,048,758 B2 | 5/2006 | Boyle | |
| 7,058,456 B2 | 6/2006 | Pierce | |
| 7,063,707 B2 | 6/2006 | Bose | |
| 7,153,320 B2 | 12/2006 | Euteneuer et al. | |
| 7,175,655 B1 | 2/2007 | Malaei | |
| 7,179,273 B1 | 2/2007 | Palmer et al. | |
| 7,220,269 B1 | 5/2007 | Ansel | |
| 7,220,271 B2 | 5/2007 | Clubb | |
| 7,226,464 B2 | 6/2007 | Garner et al. | |
| 7,229,472 B2 | 6/2007 | DePalma et al. | |
| 7,232,462 B2 | 6/2007 | Schaeffer | |
| 7,288,112 B2 | 10/2007 | Denardo et al. | |
| 7,306,618 B2 | 12/2007 | Demond | |
| 7,316,692 B2 | 1/2008 | Huffmaster | |
| 7,323,001 B2 | 1/2008 | Clubb | |
| 7,331,976 B2 | 2/2008 | McGuckin, Jr. et al. | |
| 7,344,550 B2 | 3/2008 | Carrison et al. | |
| 7,399,308 B2 | 7/2008 | Borillo et al. | |
| 7,410,491 B2 | 8/2008 | Hopkins | |
| 7,452,496 B2 | 11/2008 | Brady et al. | |
| 7,491,215 B2 | 2/2009 | Vale et al. | |
| 7,491,216 B2 | 2/2009 | Brady | |
| 7,510,565 B2 | 3/2009 | Gilson et al. | |
| 7,534,252 B2 | 5/2009 | Sepetka | |
| 7,556,636 B2 | 7/2009 | Mazzocchi | |
| 7,582,111 B2 | 9/2009 | Krolik et al. | |
| 7,594,926 B2 | 9/2009 | Linder | |
| 7,604,649 B2 | 10/2009 | McGuckin et al. | |
| 7,618,434 B2 | 11/2009 | Santra et al. | |
| 7,662,165 B2 | 2/2010 | Gilson et al. | |
| 7,670,356 B2 | 3/2010 | Mazzocchi | |
| 7,691,121 B2 | 4/2010 | Rosenbluth | |
| 7,691,124 B2 | 4/2010 | Balgobin | |
| 7,708,770 B2 | 5/2010 | Linder | |
| 7,736,385 B2 | 6/2010 | Agnew | |
| 7,766,934 B2 | 8/2010 | Pal | |
| 7,771,452 B2 | 8/2010 | Pal | |
| 7,780,694 B2 | 8/2010 | Palmer | |
| 7,780,696 B2 | 8/2010 | Daniel et al. | |
| 7,819,893 B2 | 10/2010 | Brady et al. | |
| 7,828,815 B2 | 11/2010 | Mazzocchi | |
| 7,846,175 B2 | 12/2010 | Bonnette et al. | |
| 7,846,176 B2 | 12/2010 | Mazzocchi | |
| 7,850,708 B2 | 12/2010 | Pal | |
| 7,887,560 B2 | 2/2011 | Kusleika | |
| 7,901,426 B2 | 3/2011 | Gilson et al. | |
| 7,914,549 B2 | 3/2011 | Morsi | |
| 7,922,732 B2 | 4/2011 | Mazzocchi | |
| 7,927,349 B2 | 4/2011 | Brady et al. | |
| 7,927,784 B2 | 4/2011 | Simpson | |
| 7,931,659 B2 | 4/2011 | Bose et al. | |
| 7,998,165 B2 | 8/2011 | Huffmaster | |
| 8,002,822 B2 | 8/2011 | Glocker et al. | |
| 8,021,379 B2 | 9/2011 | Thompson et al. | |
| 8,021,380 B2 | 9/2011 | Thompson et al. | |
| 8,043,326 B2 | 10/2011 | Hancock et al. | |
| 8,048,151 B2 | 11/2011 | O'Brien et al. | |
| 8,052,640 B2 | 11/2011 | Fiorella et al. | |
| 8,057,497 B1 | 11/2011 | Raju et al. | |
| 8,066,757 B2 | 11/2011 | Ferrera et al. | |
| 8,070,791 B2 | 12/2011 | Ferrera et al. | |
| 8,088,140 B2 | 1/2012 | Ferrera et al. | |
| 8,096,985 B2 | 1/2012 | Legaspi et al. | |
| 8,100,935 B2 | 1/2012 | Rosenbluth et al. | |
| 8,109,941 B2 | 2/2012 | Richardson | |
| 8,118,829 B2 | 2/2012 | Carrison et al. | |
| 8,123,769 B2 | 2/2012 | Osborne | |
| 8,137,377 B2 | 3/2012 | Palmer et al. | |
| 8,142,422 B2 | 3/2012 | Makower et al. | |
| 8,142,442 B2 | 3/2012 | Palmer et al. | |
| 8,182,508 B2 | 5/2012 | Magnuson et al. | |
| 8,187,298 B2 | 5/2012 | Pal | |
| 8,246,641 B2 | 8/2012 | Osborne et al. | |
| 8,246,672 B2 | 8/2012 | Osborne | |
| 8,252,017 B2 * | 8/2012 | Paul, Jr. | A61F 2/013 606/200 |
| 8,252,018 B2 | 8/2012 | Valaie | |
| 8,298,252 B2 | 10/2012 | Krolik et al. | |
| 8,357,178 B2 | 1/2013 | Grandfield et al. | |
| 8,357,179 B2 | 1/2013 | Grandfield et al. | |
| 8,357,893 B2 | 1/2013 | Xu et al. | |
| 8,361,095 B2 | 1/2013 | Osborne | |
| 8,366,663 B2 | 2/2013 | Fiorella et al. | |
| 8,372,133 B2 | 2/2013 | Douk et al. | |
| 8,382,742 B2 | 2/2013 | Hermann et al. | |
| 8,409,215 B2 | 4/2013 | Sepetka et al. | |
| 8,419,748 B2 | 4/2013 | Valaie | |
| 8,460,312 B2 | 6/2013 | Bose et al. | |
| 8,460,313 B2 | 6/2013 | Huffmaster | |
| 8,486,104 B2 | 7/2013 | Samson et al. | |
| 8,529,596 B2 | 9/2013 | Grandfield et al. | |
| 8,574,262 B2 | 11/2013 | Ferrera et al. | |
| 8,579,915 B2 | 11/2013 | French et al. | |
| 8,585,643 B2 | 11/2013 | Vo et al. | |

(56) References Cited

U.S. PATENT DOCUMENTS

| | | |
|---|---|---|
| 8,585,713 B2 | 11/2013 | Ferrera et al. |
| 8,608,761 B2 | 12/2013 | Osbourne et al. |
| 8,679,142 B2 | 3/2014 | Slee et al. |
| 8,696,622 B2 | 4/2014 | Fiorella et al. |
| 8,702,652 B2 | 4/2014 | Fiorella et al. |
| 8,702,724 B2 | 4/2014 | Olsen et al. |
| 8,784,434 B2 | 7/2014 | Rosenbluth et al. |
| 8,784,441 B2 | 7/2014 | Rosenbluth et al. |
| 8,795,305 B2 | 8/2014 | Grandfield et al. |
| 8,795,317 B2 | 8/2014 | Grandfield et al. |
| 8,795,345 B2 | 8/2014 | Grandfield et al. |
| 8,814,892 B2 | 8/2014 | Galdonik et al. |
| 8,814,925 B2 | 8/2014 | Hilaire et al. |
| 8,900,265 B1 | 12/2014 | Ulm, III |
| 8,939,991 B2 | 1/2015 | Krolick et al. |
| 8,945,143 B2 | 2/2015 | Ferrera et al. |
| 8,945,172 B2 | 2/2015 | Ferrera et al. |
| 8,968,330 B2 | 3/2015 | Rosenbluth et al. |
| 9,039,749 B2 | 5/2015 | Shrivastava et al. |
| 9,072,537 B2 | 7/2015 | Grandfield et al. |
| 9,113,936 B2 | 8/2015 | Palmer et al. |
| 9,119,656 B2 | 9/2015 | Bose et al. |
| 9,138,307 B2 | 9/2015 | Valaie |
| 9,149,609 B2 | 10/2015 | Ansel et al. |
| 9,155,552 B2 | 10/2015 | Ulm, III |
| 9,161,766 B2 | 10/2015 | Slee et al. |
| 9,173,668 B2 | 11/2015 | Ulm, III |
| 9,186,487 B2 | 11/2015 | Dubrul et al. |
| 9,198,687 B2 | 12/2015 | Fulkerson et al. |
| 9,204,887 B2 | 12/2015 | Cully et al. |
| 9,221,132 B2 | 12/2015 | Bowman |
| 9,232,992 B2 | 1/2016 | Heidner |
| 9,532,792 B2 | 1/2017 | Galdonik et al. |
| 9,532,873 B2 | 1/2017 | Kelley |
| 9,533,344 B2 | 1/2017 | Monetti et al. |
| 9,539,011 B2 | 1/2017 | Chen et al. |
| 9,539,022 B2 | 1/2017 | Bowman |
| 9,539,122 B2 | 1/2017 | Burke et al. |
| 9,539,382 B2 | 1/2017 | Nelson |
| 9,549,830 B2 | 1/2017 | Bruszewski et al. |
| 9,554,805 B2 | 1/2017 | Tompkins et al. |
| 9,561,094 B2 * | 2/2017 | Fulton ............... A61F 2/0108 |
| 9,561,125 B2 | 2/2017 | Bowman et al. |
| 9,572,982 B2 | 2/2017 | Burnes et al. |
| 9,579,484 B2 | 2/2017 | Barnell |
| 9,585,642 B2 | 3/2017 | Dinsmoor et al. |
| 9,615,832 B2 | 4/2017 | Bose et al. |
| 9,615,951 B2 | 4/2017 | Bennett et al. |
| 9,622,753 B2 | 4/2017 | Cox |
| 9,636,115 B2 | 5/2017 | Henry et al. |
| 9,636,439 B2 | 5/2017 | Chu et al. |
| 9,642,635 B2 | 5/2017 | Vale et al. |
| 9,642,675 B2 | 5/2017 | Werneth et al. |
| 9,655,633 B2 | 5/2017 | Leynov et al. |
| 9,655,645 B2 | 5/2017 | Staunton |
| 9,655,989 B2 | 5/2017 | Cruise et al. |
| 9,662,129 B2 | 5/2017 | Galdonik et al. |
| 9,662,238 B2 | 5/2017 | Dwork et al. |
| 9,662,425 B2 | 5/2017 | Lilja et al. |
| 9,668,898 B2 | 6/2017 | Wong |
| 9,675,477 B2 | 6/2017 | Thompson |
| 9,675,782 B2 | 6/2017 | Connolly |
| 9,676,022 B2 | 6/2017 | Ensign et al. |
| 9,692,557 B2 | 6/2017 | Murphy |
| 9,693,852 B2 | 7/2017 | Lam et al. |
| 9,700,262 B2 | 7/2017 | Janik et al. |
| 9,700,399 B2 | 7/2017 | Acosta-Acevedo |
| 9,717,421 B2 | 8/2017 | Griswold et al. |
| 9,717,500 B2 | 8/2017 | Tieu et al. |
| 9,717,502 B2 | 8/2017 | Teoh et al. |
| 9,724,103 B2 | 8/2017 | Cruise et al. |
| 9,724,526 B2 | 8/2017 | Strother et al. |
| 9,750,565 B2 | 9/2017 | Bloom et al. |
| 9,757,260 B2 | 9/2017 | Greenan |
| 9,764,111 B2 | 9/2017 | Gulachenski |
| 9,770,251 B2 | 9/2017 | Bowman et al. |
| 9,770,577 B2 | 9/2017 | Li et al. |
| 9,775,621 B2 | 10/2017 | Tompkins et al. |
| 9,775,706 B2 | 10/2017 | Paterson et al. |
| 9,775,732 B2 | 10/2017 | Khenansho |
| 9,788,800 B2 | 10/2017 | Mayoras, Jr. |
| 9,795,391 B2 | 10/2017 | Saatchi et al. |
| 9,801,980 B2 | 10/2017 | Karino et al. |
| 9,808,599 B2 | 11/2017 | Bowman et al. |
| 9,833,252 B2 | 12/2017 | Sepetka et al. |
| 9,833,604 B2 | 12/2017 | Lam et al. |
| 9,833,625 B2 | 12/2017 | Waldhauser et al. |
| 10,028,759 B2 | 7/2018 | Wallace et al. |
| 10,149,692 B2 | 12/2018 | Turjman et al. |
| 10,172,634 B1 | 1/2019 | Horowitz |
| 10,265,086 B2 | 4/2019 | Vale |
| 10,299,799 B1 | 5/2019 | DeMeritt |
| 10,610,668 B2 | 4/2020 | Burkholz et al. |
| 10,624,659 B2 * | 4/2020 | Gamba ............... A61B 17/221 |
| 10,716,915 B2 | 7/2020 | Ogle et al. |
| 10,835,271 B2 | 11/2020 | Ma |
| 10,986,984 B2 * | 4/2021 | Chen ................. A61B 1/32 |
| 11,076,876 B2 | 8/2021 | Vale |
| 11,272,945 B2 * | 3/2022 | Shrivastava ...... A61M 25/1002 |
| 11,273,062 B2 | 3/2022 | Goldberg et al. |
| 11,376,028 B1 | 7/2022 | Saadat et al. |
| 11,446,045 B2 | 9/2022 | Vale et al. |
| 11,534,078 B2 | 12/2022 | Tang et al. |
| 11,633,198 B2 | 4/2023 | Keating et al. |
| 2001/0001315 A1 | 5/2001 | Bates |
| 2001/0011182 A1 | 8/2001 | Dubrul et al. |
| 2001/0016755 A1 | 8/2001 | Addis |
| 2001/0041899 A1 | 11/2001 | Foster |
| 2001/0044598 A1 | 11/2001 | Parodi |
| 2001/0044634 A1 | 11/2001 | Don Michael et al. |
| 2001/0051810 A1 | 12/2001 | Dubrul |
| 2002/0002383 A1 | 1/2002 | Sepetka et al. |
| 2002/0016609 A1 | 2/2002 | Wensel |
| 2002/0022859 A1 | 2/2002 | Hogendijk |
| 2002/0026211 A1 | 2/2002 | Khosravi |
| 2002/0049468 A1 | 4/2002 | Streeter |
| 2002/0052620 A1 | 5/2002 | Barvut |
| 2002/0068954 A1 | 6/2002 | Foster |
| 2002/0072764 A1 | 6/2002 | Sepetka |
| 2002/0082558 A1 | 6/2002 | Samson |
| 2002/0091407 A1 | 7/2002 | Zadno-Azizi et al. |
| 2002/0095171 A1 | 7/2002 | Belef |
| 2002/0123765 A1 | 9/2002 | Sepetka |
| 2002/0143362 A1 | 10/2002 | Macoviak et al. |
| 2002/0156455 A1 | 10/2002 | Barbut |
| 2002/0161393 A1 | 10/2002 | Demond |
| 2002/0165576 A1 | 11/2002 | Boyle et al. |
| 2002/0173819 A1 | 11/2002 | Leeflang et al. |
| 2002/0177800 A1 | 11/2002 | Bagaoisan et al. |
| 2002/0188276 A1 | 12/2002 | Evans |
| 2003/0004536 A1 | 1/2003 | Boylan et al. |
| 2003/0004538 A1 | 1/2003 | Secrest |
| 2003/0004542 A1 | 1/2003 | Wensel |
| 2003/0009146 A1 | 1/2003 | Muni |
| 2003/0009191 A1 | 1/2003 | Wensel |
| 2003/0023204 A1 | 1/2003 | Vo et al. |
| 2003/0040769 A1 | 2/2003 | Kelley et al. |
| 2003/0040772 A1 | 2/2003 | Hyodoh et al. |
| 2003/0050663 A1 | 3/2003 | Khachin |
| 2003/0060833 A1 | 3/2003 | Carrison et al. |
| 2003/0088266 A1 * | 5/2003 | Bowlin ................. A61M 5/165 977/960 |
| 2003/0100847 A1 | 5/2003 | D'Aquanni et al. |
| 2003/0105484 A1 | 6/2003 | Boyle et al. |
| 2003/0125798 A1 | 7/2003 | Martin |
| 2003/0130682 A1 | 7/2003 | Broome et al. |
| 2003/0144687 A1 | 7/2003 | Brady et al. |
| 2003/0144689 A1 | 7/2003 | Brady et al. |
| 2003/0153940 A1 | 8/2003 | Nohilly et al. |
| 2003/0153943 A1 | 8/2003 | Michael et al. |
| 2003/0153944 A1 | 8/2003 | Phung |
| 2003/0163064 A1 | 8/2003 | Vrba |
| 2003/0163158 A1 | 8/2003 | Wlite |
| 2003/0171769 A1 | 9/2003 | Barbu |

(56) References Cited

U.S. PATENT DOCUMENTS

| | | |
|---|---|---|
| 2003/0176884 A1 | 9/2003 | Berrada et al. |
| 2003/0181939 A1 | 9/2003 | Bonutti |
| 2003/0187495 A1 | 10/2003 | Cully et al. |
| 2003/0195537 A1 | 10/2003 | Dubrul |
| 2003/0195554 A1 | 10/2003 | Shen |
| 2003/0199917 A1 | 10/2003 | Knudson |
| 2003/0204202 A1 | 10/2003 | Palmer |
| 2003/0212430 A1 | 11/2003 | Bose |
| 2003/0216611 A1 | 11/2003 | Vu |
| 2003/0236533 A1 | 12/2003 | Wilson |
| 2004/0010280 A1 | 1/2004 | Adams et al. |
| 2004/0010282 A1 | 1/2004 | Kusleika |
| 2004/0014002 A1 | 1/2004 | Lundgren |
| 2004/0068288 A1 | 4/2004 | Palmer et al. |
| 2004/0073243 A1 | 4/2004 | Sepetka |
| 2004/0079429 A1 | 4/2004 | Miller |
| 2004/0082962 A1 | 4/2004 | Demarais et al. |
| 2004/0093065 A1 | 5/2004 | Yachia et al. |
| 2004/0133231 A1 | 7/2004 | Maitland |
| 2004/0138692 A1 | 7/2004 | Phung |
| 2004/0153049 A1* | 8/2004 | Hewitt ............... A61M 25/0012 604/527 |
| 2004/0153118 A1 | 8/2004 | Clubb |
| 2004/0193107 A1 | 9/2004 | Pierpont et al. |
| 2004/0199202 A1 | 10/2004 | Dubrul et al. |
| 2004/0236397 A1 | 11/2004 | Coe et al. |
| 2004/0260333 A1 | 12/2004 | Dubrul et al. |
| 2005/0015047 A1 | 1/2005 | Shah |
| 2005/0020974 A1 | 1/2005 | Noriega |
| 2005/0033348 A1 | 2/2005 | Sepetka |
| 2005/0038447 A1 | 2/2005 | Huffmaster |
| 2005/0038468 A1 | 2/2005 | Panetta et al. |
| 2005/0049619 A1 | 3/2005 | Sepetka |
| 2005/0049669 A1 | 3/2005 | Jones |
| 2005/0049670 A1 | 3/2005 | Jones et al. |
| 2005/0055033 A1 | 3/2005 | Leslie et al. |
| 2005/0055047 A1 | 3/2005 | Greenhalgh |
| 2005/0059993 A1 | 3/2005 | Ramzipoor et al. |
| 2005/0059995 A1 | 3/2005 | Sepetka |
| 2005/0085849 A1 | 4/2005 | Sepetka |
| 2005/0090857 A1 | 4/2005 | Kusleika et al. |
| 2005/0119524 A1 | 6/2005 | Sekine et al. |
| 2005/0119668 A1 | 6/2005 | Teague et al. |
| 2005/0125024 A1 | 6/2005 | Sepetka |
| 2005/0131449 A1 | 6/2005 | Salahieh et al. |
| 2005/0149111 A1 | 7/2005 | Kanazawa et al. |
| 2005/0159770 A1* | 7/2005 | Divani ............... A61M 29/00 606/200 |
| 2005/0171566 A1 | 8/2005 | Kanamaru |
| 2005/0187570 A1 | 8/2005 | Nguyen et al. |
| 2005/0216030 A1 | 9/2005 | Sepetka |
| 2005/0216050 A1 | 9/2005 | Sepetka |
| 2005/0228417 A1 | 10/2005 | Teitelbaum et al. |
| 2005/0267491 A1 | 12/2005 | Kellett et al. |
| 2005/0288686 A1 | 12/2005 | Sepetka |
| 2006/0009785 A1 | 1/2006 | Maitland et al. |
| 2006/0009799 A1 | 1/2006 | Kleshinski et al. |
| 2006/0010636 A1 | 1/2006 | Vacher |
| 2006/0030933 A1 | 2/2006 | DeLeggge et al. |
| 2006/0036271 A1 | 2/2006 | Schomer et al. |
| 2006/0058836 A1 | 3/2006 | Bose |
| 2006/0058837 A1 | 3/2006 | Bose |
| 2006/0058838 A1 | 3/2006 | Bose |
| 2006/0064151 A1 | 3/2006 | Guterman et al. |
| 2006/0149313 A1 | 7/2006 | Arguello et al. |
| 2006/0155305 A1 | 7/2006 | Freudenthal |
| 2006/0155322 A1 | 7/2006 | Sater et al. |
| 2006/0161187 A1 | 7/2006 | Levine et al. |
| 2006/0184191 A1 | 8/2006 | O'Brien |
| 2006/0195137 A1 | 8/2006 | Sepetka |
| 2006/0224177 A1 | 10/2006 | Finitsis |
| 2006/0224179 A1 | 10/2006 | Kucharczyk |
| 2006/0229638 A1 | 10/2006 | Abrams et al. |
| 2006/0282111 A1 | 12/2006 | Morsi |
| 2006/0287701 A1 | 12/2006 | Pal |
| 2007/0088383 A1 | 4/2007 | Pal et al. |
| 2007/0142858 A1 | 6/2007 | Bates |
| 2007/0149996 A1 | 6/2007 | Coughlin |
| 2007/0156170 A1 | 7/2007 | Hancock |
| 2007/0165170 A1 | 7/2007 | Fukuda |
| 2007/0179513 A1 | 8/2007 | Deutsch |
| 2007/0191866 A1 | 8/2007 | Palmer et al. |
| 2007/0198028 A1 | 8/2007 | Miloslavski |
| 2007/0198051 A1 | 8/2007 | Clubb et al. |
| 2007/0198075 A1 | 8/2007 | Levy |
| 2007/0208367 A1 | 9/2007 | Fiorella |
| 2007/0208371 A1 | 9/2007 | French |
| 2007/0213765 A1 | 9/2007 | Adams et al. |
| 2007/0225749 A1 | 9/2007 | Martin |
| 2007/0239182 A1 | 10/2007 | Glines et al. |
| 2007/0239254 A1 | 10/2007 | Chia et al. |
| 2007/0244505 A1 | 10/2007 | Gilson et al. |
| 2007/0244550 A1 | 10/2007 | Eidenschink |
| 2007/0270902 A1 | 11/2007 | Slazas et al. |
| 2007/0288038 A1 | 12/2007 | Bimbo |
| 2007/0293887 A1 | 12/2007 | Okushi et al. |
| 2008/0041516 A1 | 2/2008 | Chiu et al. |
| 2008/0045881 A1 | 2/2008 | Teitelbaum et al. |
| 2008/0058590 A1* | 3/2008 | Saadat ............... A61B 1/041 606/198 |
| 2008/0082107 A1 | 4/2008 | Miller et al. |
| 2008/0086190 A1 | 4/2008 | Ta |
| 2008/0091223 A1 | 4/2008 | Pokorney |
| 2008/0097398 A1 | 4/2008 | Mitelberg |
| 2008/0109031 A1 | 5/2008 | Sepetka |
| 2008/0109032 A1 | 5/2008 | Sepetka |
| 2008/0119886 A1 | 5/2008 | Greenhalgh et al. |
| 2008/0177296 A1 | 7/2008 | Sepetka |
| 2008/0183197 A1 | 7/2008 | Sepetka |
| 2008/0183198 A1 | 7/2008 | Sepetka |
| 2008/0183205 A1 | 7/2008 | Sepetka |
| 2008/0188876 A1 | 8/2008 | Sepetka |
| 2008/0188885 A1 | 8/2008 | Sepetka |
| 2008/0188928 A1 | 8/2008 | Salahieh |
| 2008/0200946 A1 | 8/2008 | Braun |
| 2008/0215077 A1 | 9/2008 | Sepetka |
| 2008/0221600 A1 | 9/2008 | Dieck et al. |
| 2008/0228209 A1 | 9/2008 | DeMello et al. |
| 2008/0234706 A1 | 9/2008 | Sepetka |
| 2008/0243170 A1 | 10/2008 | Jenson |
| 2008/0255596 A1 | 10/2008 | Jenson |
| 2008/0262528 A1 | 10/2008 | Martin |
| 2008/0262532 A1 | 10/2008 | Martin |
| 2008/0269774 A1 | 10/2008 | Garcia et al. |
| 2008/0275488 A1 | 11/2008 | Fleming |
| 2008/0275493 A1 | 11/2008 | Farmiga |
| 2008/0281350 A1 | 11/2008 | Sepetka |
| 2008/0312681 A1 | 12/2008 | Ansel |
| 2009/0024157 A1 | 1/2009 | Anukhin |
| 2009/0054918 A1 | 2/2009 | Henson |
| 2009/0069828 A1 | 3/2009 | Martin |
| 2009/0076539 A1 | 3/2009 | Valaie |
| 2009/0105722 A1 | 4/2009 | Fulkerson |
| 2009/0105737 A1 | 4/2009 | Fulkerson |
| 2009/0131908 A1 | 5/2009 | McKay |
| 2009/0163846 A1 | 6/2009 | Aklog et al. |
| 2009/0171439 A1 | 7/2009 | Nissl |
| 2009/0177206 A1 | 7/2009 | Lozier et al. |
| 2009/0182336 A1 | 7/2009 | Brenzel et al. |
| 2009/0221967 A1 | 9/2009 | Thommen et al. |
| 2009/0270815 A1 | 10/2009 | Stamp et al. |
| 2009/0281610 A1 | 11/2009 | Parker |
| 2009/0292297 A1 | 11/2009 | Ferrere |
| 2009/0292307 A1 | 11/2009 | Razack |
| 2009/0299374 A1 | 12/2009 | Tilson et al. |
| 2009/0299393 A1 | 12/2009 | Martin |
| 2009/0306702 A1 | 12/2009 | Miloslavski |
| 2010/0004607 A1 | 1/2010 | Wilson et al. |
| 2010/0016957 A1 | 1/2010 | Jager et al. |
| 2010/0030186 A1 | 2/2010 | Stivland |
| 2010/0030256 A1 | 2/2010 | Dubrul et al. |
| 2010/0036312 A1 | 2/2010 | Krolik et al. |
| 2010/0087908 A1 | 4/2010 | Hilaire |
| 2010/0114017 A1 | 5/2010 | Lenker |

(56) References Cited

U.S. PATENT DOCUMENTS

| | | |
|---|---|---|
| 2010/0125326 A1 | 5/2010 | Kalstad |
| 2010/0125327 A1 | 5/2010 | Agnew |
| 2010/0137846 A1 | 6/2010 | Desai et al. |
| 2010/0191272 A1 | 7/2010 | Keating |
| 2010/0211094 A1 | 8/2010 | Sargent, Jr. |
| 2010/0249815 A1 | 9/2010 | Jantzen et al. |
| 2010/0268264 A1 | 10/2010 | Bonnett et al. |
| 2010/0268265 A1 | 10/2010 | Krolik et al. |
| 2010/0292726 A1 | 11/2010 | Olsen et al. |
| 2010/0305566 A1 | 12/2010 | Rosenblatt et al. |
| 2010/0305604 A1 | 12/2010 | Pah |
| 2010/0318178 A1 | 12/2010 | Rapaport et al. |
| 2010/0324649 A1 | 12/2010 | Mattsson |
| 2010/0331949 A1 | 12/2010 | Habib |
| 2011/0009875 A1 | 1/2011 | Grandfield et al. |
| 2011/0009940 A1 | 1/2011 | Grandfield et al. |
| 2011/0009942 A1 | 1/2011 | Gregorich |
| 2011/0022149 A1 | 1/2011 | Cox et al. |
| 2011/0054504 A1 | 3/2011 | Porter |
| 2011/0054514 A1 | 3/2011 | Arcand |
| 2011/0054516 A1 | 3/2011 | Keegan |
| 2011/0060359 A1 | 3/2011 | Hannes |
| 2011/0071432 A1 | 3/2011 | Carrillo, Jr. et al. |
| 2011/0077620 A1 | 3/2011 | deBeer |
| 2011/0098683 A1 | 4/2011 | Wiita et al. |
| 2011/0125181 A1* | 5/2011 | Brady .............. A61B 17/22031 606/200 |
| 2011/0130756 A1 | 6/2011 | Everson, Jr. et al. |
| 2011/0152920 A1 | 6/2011 | Eckhouse et al. |
| 2011/0160763 A1 | 6/2011 | Ferrera et al. |
| 2011/0166586 A1 | 7/2011 | Sepetka et al. |
| 2011/0196414 A1 | 8/2011 | Porter et al. |
| 2011/0202088 A1 | 8/2011 | Eckhouse et al. |
| 2011/0213290 A1 | 9/2011 | Chin et al. |
| 2011/0213297 A1 | 9/2011 | Aklog et al. |
| 2011/0213393 A1 | 9/2011 | Aklog et al. |
| 2011/0213403 A1 | 9/2011 | Aboytes |
| 2011/0218564 A1 | 9/2011 | Drasler et al. |
| 2011/0224707 A1 | 9/2011 | Miloslavaski et al. |
| 2011/0264132 A1 | 10/2011 | Strauss et al. |
| 2011/0276120 A1 | 11/2011 | Gilson et al. |
| 2011/0288529 A1* | 11/2011 | Fulton .................... A61M 25/04 604/510 |
| 2011/0319917 A1 | 12/2011 | Ferrera et al. |
| 2012/0041449 A1 | 2/2012 | Eckhouse et al. |
| 2012/0041474 A1 | 2/2012 | Eckhouse et al. |
| 2012/0059356 A1 | 3/2012 | diPama et al. |
| 2012/0089216 A1 | 4/2012 | Rapaport et al. |
| 2012/0101510 A1 | 4/2012 | Lenker et al. |
| 2012/0116351 A1* | 5/2012 | Chomas ................ A61F 2/2436 604/508 |
| 2012/0116440 A1 | 5/2012 | Leynov et al. |
| 2012/0143237 A1 | 6/2012 | Cam et al. |
| 2012/0143239 A1 | 6/2012 | Aklog et al. |
| 2012/0150147 A1 | 6/2012 | Leynov et al. |
| 2012/0165858 A1 | 6/2012 | Eckhouse et al. |
| 2012/0165859 A1 | 6/2012 | Eckhouse et al. |
| 2012/0215250 A1 | 8/2012 | Grandfield et al. |
| 2012/0239022 A1 | 9/2012 | Wolfe |
| 2012/0277788 A1 | 11/2012 | Cattaneo |
| 2012/0283768 A1 | 11/2012 | Cox et al. |
| 2012/0296362 A1 | 11/2012 | Cam et al. |
| 2012/0316600 A1 | 12/2012 | Ferrera et al. |
| 2013/0006284 A1 | 1/2013 | Aggerholm et al. |
| 2013/0030461 A1 | 1/2013 | Marks et al. |
| 2013/0035628 A1 | 2/2013 | Garrison et al. |
| 2013/0046330 A1 | 2/2013 | McIntosh et al. |
| 2013/0046333 A1 | 2/2013 | Jones et al. |
| 2013/0046334 A1 | 2/2013 | Jones et al. |
| 2013/0060234 A1 | 3/2013 | Besser et al. |
| 2013/0116774 A1 | 5/2013 | Strauss et al. |
| 2013/0131614 A1 | 5/2013 | Hassan et al. |
| 2013/0144326 A1 | 6/2013 | Brady et al. |
| 2013/0144328 A1 | 6/2013 | Weber et al. |
| 2013/0158592 A1 | 6/2013 | Porter |
| 2013/0184703 A1 | 7/2013 | Shireman et al. |
| 2013/0184739 A1 | 7/2013 | Brady et al. |
| 2013/0197567 A1 | 8/2013 | Brady et al. |
| 2013/0225934 A1* | 8/2013 | Raybin .............. A61B 1/00089 606/170 |
| 2013/0226146 A1 | 8/2013 | Tekulve |
| 2013/0268050 A1 | 10/2013 | Wilson et al. |
| 2013/0281788 A1 | 10/2013 | Garrison |
| 2013/0289697 A1 | 10/2013 | Baker et al. |
| 2013/0304082 A1 | 11/2013 | Aklog et al. |
| 2013/0325055 A1 | 12/2013 | Eckhouse et al. |
| 2013/0325056 A1 | 12/2013 | Eckhouse et al. |
| 2013/0345739 A1 | 12/2013 | Brady et al. |
| 2014/0012281 A1 | 1/2014 | Wang et al. |
| 2014/0046359 A1 | 2/2014 | Bowman et al. |
| 2014/0052097 A1 | 2/2014 | Petersen et al. |
| 2014/0058324 A1 | 2/2014 | Salahieh et al. |
| 2014/0081243 A1 | 3/2014 | Zhou et al. |
| 2014/0121672 A1 | 5/2014 | Folk |
| 2014/0128905 A1 | 5/2014 | Molaei |
| 2014/0135812 A1 | 5/2014 | Divino et al. |
| 2014/0148889 A1 | 5/2014 | Deshmukh et al. |
| 2014/0180377 A1 | 6/2014 | Bose et al. |
| 2014/0188127 A1 | 7/2014 | Dubrul et al. |
| 2014/0194919 A1 | 7/2014 | Losardo et al. |
| 2014/0200607 A1 | 7/2014 | Sepetka et al. |
| 2014/0200608 A1 | 7/2014 | Brady et al. |
| 2014/0236220 A1 | 8/2014 | Inoue |
| 2014/0257018 A1 | 9/2014 | Farnan |
| 2014/0257362 A1 | 9/2014 | Eldenschink |
| 2014/0276840 A1 | 9/2014 | Richter et al. |
| 2014/0276922 A1 | 9/2014 | McLain et al. |
| 2014/0277003 A1 | 9/2014 | Hendrick |
| 2014/0277015 A1* | 9/2014 | Stinis ............ A61B 17/320725 606/159 |
| 2014/0277053 A1 | 9/2014 | Wang et al. |
| 2014/0277079 A1 | 9/2014 | Vale et al. |
| 2014/0309657 A1 | 10/2014 | Ben-Ami |
| 2014/0309673 A1 | 10/2014 | Dacuycuy et al. |
| 2014/0330302 A1 | 11/2014 | Tekulve et al. |
| 2014/0343585 A1 | 11/2014 | Ferrera et al. |
| 2014/0364896 A1 | 12/2014 | Consigny |
| 2014/0371769 A1 | 12/2014 | Vale et al. |
| 2014/0371777 A1 | 12/2014 | Rudakov et al. |
| 2014/0371779 A1 | 12/2014 | Vale et al. |
| 2014/0371780 A1 | 12/2014 | Vale et al. |
| 2014/0379023 A1 | 12/2014 | Brady et al. |
| 2015/0018859 A1 | 1/2015 | Quick et al. |
| 2015/0018860 A1 | 1/2015 | Quick et al. |
| 2015/0039020 A1 | 2/2015 | Cragg et al. |
| 2015/0080937 A1 | 3/2015 | Davidson |
| 2015/0081003 A1 | 3/2015 | Wainwright et al. |
| 2015/0112376 A1 | 4/2015 | Molaei et al. |
| 2015/0133988 A1 | 5/2015 | Chuter |
| 2015/0133990 A1 | 5/2015 | Davidson |
| 2015/0142043 A1 | 5/2015 | Furey |
| 2015/0157344 A1 | 6/2015 | Tah et al. |
| 2015/0164523 A1 | 6/2015 | Brady et al. |
| 2015/0173782 A1 | 6/2015 | Garrison et al. |
| 2015/0173783 A1 | 6/2015 | Tah et al. |
| 2015/0238314 A1 | 8/2015 | Börtlein et al. |
| 2015/0250497 A1 | 9/2015 | Marks et al. |
| 2015/0257775 A1 | 9/2015 | Gilvarry et al. |
| 2015/0258270 A1 | 9/2015 | Kunis |
| 2015/0265329 A1 | 9/2015 | Lalonde et al. |
| 2015/0289902 A1 | 10/2015 | Hehrlein |
| 2015/0290437 A1 | 10/2015 | Rudakov et al. |
| 2015/0297252 A1 | 10/2015 | Miloslavski et al. |
| 2015/0306311 A1 | 10/2015 | Pinchuk et al. |
| 2015/0313617 A1 | 11/2015 | Grandfield et al. |
| 2015/0320431 A1 | 11/2015 | Ulm, III |
| 2015/0343178 A1* | 12/2015 | Fulton, III ............ A61M 25/04 604/509 |
| 2015/0351770 A1 | 12/2015 | Fulton, III |
| 2015/0352325 A1 | 12/2015 | Quick |
| 2015/0359547 A1 | 12/2015 | Vale et al. |
| 2015/0374391 A1 | 12/2015 | Quick et al. |
| 2015/0374393 A1 | 12/2015 | Brady et al. |
| 2015/0374479 A1 | 12/2015 | Vale |

(56) References Cited

U.S. PATENT DOCUMENTS

| | | |
|---|---|---|
| 2016/0015402 A1 | 1/2016 | Brady et al. |
| 2016/0022296 A1 | 1/2016 | Brady et al. |
| 2016/0066921 A1 | 3/2016 | Brady et al. |
| 2016/0067461 A1 | 3/2016 | Gelbart |
| 2016/0074067 A1 | 3/2016 | Furnish et al. |
| 2016/0106448 A1 | 4/2016 | Brady et al. |
| 2016/0106449 A1 | 4/2016 | Brady et al. |
| 2016/0113663 A1 | 4/2016 | Brady et al. |
| 2016/0113664 A1 | 4/2016 | Brady et al. |
| 2016/0113665 A1 | 4/2016 | Brady et al. |
| 2016/0120558 A1 | 5/2016 | Brady et al. |
| 2016/0121080 A1 | 5/2016 | Cottone |
| 2016/0135829 A1 | 5/2016 | Holochwost et al. |
| 2016/0143653 A1 | 5/2016 | Vale et al. |
| 2016/0151079 A1 | 6/2016 | Aklog et al. |
| 2016/0192953 A1 | 7/2016 | Brady et al. |
| 2016/0192954 A1 | 7/2016 | Brady et al. |
| 2016/0192955 A1 | 7/2016 | Brady et al. |
| 2016/0192956 A1 | 7/2016 | Brady et al. |
| 2016/0193457 A1 | 7/2016 | Arnholt et al. |
| 2016/0228134 A1 | 8/2016 | Martin et al. |
| 2016/0256180 A1 | 9/2016 | Vale et al. |
| 2016/0262880 A1 | 9/2016 | Li et al. |
| 2016/0317168 A1 | 11/2016 | Brady et al. |
| 2016/0346002 A1 | 12/2016 | Avneri et al. |
| 2017/0007264 A1 | 1/2017 | Cruise et al. |
| 2017/0007265 A1 | 1/2017 | Guo et al. |
| 2017/0020670 A1 | 1/2017 | Murray et al. |
| 2017/0020700 A1 | 1/2017 | Bienvenu et al. |
| 2017/0027640 A1 | 2/2017 | Kunis et al. |
| 2017/0027692 A1 | 2/2017 | Bonhoeffer et al. |
| 2017/0027725 A1 | 2/2017 | Argentine |
| 2017/0035436 A1 | 2/2017 | Morita |
| 2017/0035567 A1 | 2/2017 | Duffy |
| 2017/0042548 A1 | 2/2017 | Lam |
| 2017/0049596 A1 | 2/2017 | Schabert |
| 2017/0065401 A1 | 3/2017 | Fearnot et al. |
| 2017/0071614 A1 | 3/2017 | Vale et al. |
| 2017/0071737 A1 | 3/2017 | Kelley |
| 2017/0072452 A1 | 3/2017 | Monetti et al. |
| 2017/0079671 A1 | 3/2017 | Morero et al. |
| 2017/0079680 A1 | 3/2017 | Bowman |
| 2017/0079766 A1 | 3/2017 | Wang et al. |
| 2017/0079767 A1 | 3/2017 | Leon-Yip |
| 2017/0079812 A1 | 3/2017 | Lam et al. |
| 2017/0079817 A1 | 3/2017 | Sepetka et al. |
| 2017/0079819 A1 | 3/2017 | Pung et al. |
| 2017/0079820 A1 | 3/2017 | Lam et al. |
| 2017/0086851 A1 | 3/2017 | Wallace et al. |
| 2017/0086862 A1 | 3/2017 | Vale et al. |
| 2017/0086863 A1 | 3/2017 | Brady et al. |
| 2017/0086864 A1 | 3/2017 | Greenhalgh et al. |
| 2017/0086996 A1 | 3/2017 | Peterson et al. |
| 2017/0095138 A1 | 4/2017 | Nakade et al. |
| 2017/0095259 A1 | 4/2017 | Tompkins et al. |
| 2017/0100126 A1 | 4/2017 | Bowman et al. |
| 2017/0100141 A1 | 4/2017 | Morero et al. |
| 2017/0100142 A1 | 4/2017 | Look et al. |
| 2017/0100143 A1 | 4/2017 | Granfield |
| 2017/0100183 A1 | 4/2017 | Iaizzo et al. |
| 2017/0105743 A1 | 4/2017 | Vale et al. |
| 2017/0112515 A1 | 4/2017 | Brady et al. |
| 2017/0113023 A1 | 4/2017 | Steingisser et al. |
| 2017/0113026 A1 | 4/2017 | Finch |
| 2017/0136158 A1* | 5/2017 | Culhane .................. A61M 1/77 |
| 2017/0147765 A1 | 5/2017 | Mehta |
| 2017/0151032 A1 | 6/2017 | Loisel |
| 2017/0165062 A1 | 6/2017 | Rothstein |
| 2017/0165065 A1 | 6/2017 | Rothstein et al. |
| 2017/0165454 A1 | 6/2017 | Tuohy et al. |
| 2017/0172554 A1 | 6/2017 | Bortlein et al. |
| 2017/0172581 A1 | 6/2017 | Bose et al. |
| 2017/0172766 A1 | 6/2017 | Vong et al. |
| 2017/0172772 A1 | 6/2017 | Khenansho |
| 2017/0189033 A1 | 7/2017 | Sepetka et al. |
| 2017/0189035 A1 | 7/2017 | Porter |
| 2017/0215900 A1 | 8/2017 | Lowinger et al. |
| 2017/0215902 A1 | 8/2017 | Leynov et al. |
| 2017/0216484 A1 | 8/2017 | Cruise et al. |
| 2017/0224350 A1 | 8/2017 | Shimizu et al. |
| 2017/0224355 A1 | 8/2017 | Bowman et al. |
| 2017/0224467 A1 | 8/2017 | Piccagli et al. |
| 2017/0224511 A1 | 8/2017 | Dwork et al. |
| 2017/0224953 A1 | 8/2017 | Tran et al. |
| 2017/0231749 A1 | 8/2017 | Perkins et al. |
| 2017/0238953 A1 | 8/2017 | Yang et al. |
| 2017/0239447 A1 | 8/2017 | Yang et al. |
| 2017/0252043 A1 | 9/2017 | Fuller et al. |
| 2017/0252064 A1 | 9/2017 | Staunton |
| 2017/0259042 A1 | 9/2017 | Nguyen et al. |
| 2017/0265983 A1 | 9/2017 | Lam et al. |
| 2017/0281192 A1 | 10/2017 | Tieu et al. |
| 2017/0281331 A1 | 10/2017 | Perkins et al. |
| 2017/0281344 A1 | 10/2017 | Costello |
| 2017/0281909 A1 | 10/2017 | Northrop et al. |
| 2017/0281912 A1 | 10/2017 | Melder et al. |
| 2017/0290593 A1 | 10/2017 | Sethna |
| 2017/0290654 A1 | 10/2017 | Sethna |
| 2017/0296324 A1 | 10/2017 | Argentine |
| 2017/0296325 A1 | 10/2017 | Marrocco et al. |
| 2017/0303939 A1 | 10/2017 | Greenhalgh et al. |
| 2017/0303942 A1 | 10/2017 | Greenhalgh et al. |
| 2017/0303947 A1 | 10/2017 | Greenhalgh et al. |
| 2017/0303948 A1 | 10/2017 | Wallace et al. |
| 2017/0304041 A1 | 10/2017 | Argentine |
| 2017/0304097 A1 | 10/2017 | Corwin et al. |
| 2017/0304595 A1 | 10/2017 | Nagasrinivasa et al. |
| 2017/0312109 A1 | 11/2017 | Le |
| 2017/0312484 A1 | 11/2017 | Shipley et al. |
| 2017/0316561 A1 | 11/2017 | Helm et al. |
| 2017/0319826 A1 | 11/2017 | Bowman et al. |
| 2017/0333228 A1 | 11/2017 | Orth et al. |
| 2017/0333236 A1 | 11/2017 | Greenan |
| 2017/0333678 A1 | 11/2017 | Bowman et al. |
| 2017/0340383 A1 | 11/2017 | Bloom et al. |
| 2017/0348014 A1 | 12/2017 | Wallace et al. |
| 2017/0348514 A1 | 12/2017 | Guyon et al. |
| 2018/0008407 A1 | 1/2018 | Maimon et al. |
| 2018/0042623 A1 | 2/2018 | Batiste |
| 2018/0064526 A1* | 3/2018 | Walzman .................. A61B 8/12 |
| 2018/0132896 A1 | 5/2018 | Begg |
| 2018/0140315 A1 | 5/2018 | Bowman et al. |
| 2018/0193050 A1 | 7/2018 | Hawkins et al. |
| 2018/0193591 A1 | 7/2018 | Jaroch et al. |
| 2018/0235644 A1* | 8/2018 | Jaffe .................... A61B 17/221 |
| 2018/0235743 A1 | 8/2018 | Farago et al. |
| 2018/0256177 A1 | 9/2018 | Cooper et al. |
| 2018/0303609 A1 | 10/2018 | Kenny et al. |
| 2018/0303610 A1 | 10/2018 | Anderson |
| 2018/0368965 A1* | 12/2018 | Janardhan ............... A61M 1/84 |
| 2019/0021755 A1 | 1/2019 | Johnson et al. |
| 2019/0021759 A1 | 1/2019 | Krolik et al. |
| 2019/0029820 A1 | 1/2019 | Zhou et al. |
| 2019/0029825 A1 | 1/2019 | Fitterer et al. |
| 2019/0046219 A1 | 2/2019 | Marchand et al. |
| 2019/0192175 A1 | 6/2019 | Chida et al. |
| 2019/0209206 A1 | 7/2019 | Patel et al. |
| 2019/0216476 A1 | 7/2019 | Barry et al. |
| 2019/0239907 A1 | 8/2019 | Brady et al. |
| 2019/0247627 A1 | 8/2019 | Korkuch et al. |
| 2019/0255290 A1 | 8/2019 | Snyder et al. |
| 2019/0269491 A1* | 9/2019 | Jalgaonkar ........ A61M 25/0074 |
| 2019/0274810 A1* | 9/2019 | Phouasalit ............ A61B 17/221 |
| 2019/0298396 A1* | 10/2019 | Gamba ................ A61B 17/221 |
| 2019/0343614 A1* | 11/2019 | Walzman ............... A61B 17/22 |
| 2019/0365411 A1 | 12/2019 | Avneri et al. |
| 2019/0366049 A1 | 12/2019 | Hannon et al. |
| 2020/0038628 A1 | 2/2020 | Chou et al. |
| 2020/0069912 A1 | 3/2020 | Tateshima |
| 2020/0155180 A1* | 5/2020 | Follmer .............. A61M 39/1011 |
| 2020/0170662 A1* | 6/2020 | Vardi .................. A61B 17/3205 |
| 2020/0214859 A1 | 7/2020 | Sherburne |
| 2020/0281611 A1 | 9/2020 | Kelly et al. |
| 2020/0281612 A1* | 9/2020 | Kelly .................... A61M 29/00 |

(56) References Cited

U.S. PATENT DOCUMENTS

| | | |
|---|---|---|
| 2020/0353208 A1 | 11/2020 | Merhi et al. |
| 2020/0383698 A1 | 12/2020 | Miao et al. |
| 2021/0068854 A1* | 3/2021 | Wallace ............ A61M 25/0043 |
| 2021/0085935 A1 | 3/2021 | Fahey et al. |
| 2021/0128184 A1 | 5/2021 | Fulkerson et al. |
| 2021/0128185 A1 | 5/2021 | Nguyen et al. |
| 2021/0153883 A1 | 5/2021 | Casey et al. |
| 2021/0153884 A1* | 5/2021 | Casey ............... A61M 25/0147 |
| 2021/0154433 A1* | 5/2021 | Casey ............... A61M 25/0133 |
| 2021/0186547 A1* | 6/2021 | Kassab ............... A61M 25/008 |
| 2021/0219821 A1 | 7/2021 | Appling et al. |
| 2021/0228223 A1 | 7/2021 | Casey et al. |
| 2021/0236257 A1* | 8/2021 | Walzman ......... A61B 17/32037 |
| 2021/0275197 A1 | 9/2021 | Vale et al. |
| 2021/0307766 A1 | 10/2021 | Keating et al. |
| 2021/0393277 A1* | 12/2021 | Vale .................. A61M 25/0043 |
| 2022/0117614 A1* | 4/2022 | Salmon ................. A61B 17/221 |
| 2022/0125450 A1* | 4/2022 | Sirhan .................... A61B 17/22 |
| 2022/0211397 A1 | 7/2022 | Nicholson et al. |
| 2022/0280173 A1 | 9/2022 | Ngo et al. |
| 2022/0313426 A1 | 10/2022 | Gifford, III et al. |
| 2022/0395667 A1* | 12/2022 | Keating ............ A61M 25/0074 |
| 2023/0054898 A1 | 2/2023 | Gurovich et al. |
| 2023/0076384 A1 | 3/2023 | Cummings et al. |
| 2023/0095102 A1* | 3/2023 | Vale ..................... A61B 17/221 606/159 |
| 2023/0132996 A1* | 5/2023 | Stefanov ............... A61B 17/221 606/159 |
| 2023/0137418 A1 | 5/2023 | Kelly et al. |
| 2023/0140794 A1* | 5/2023 | Keating ............... A61B 17/221 606/200 |
| 2024/0100298 A1* | 3/2024 | Keating ............... A61M 25/005 |

FOREIGN PATENT DOCUMENTS

| | | |
|---|---|---|
| CN | 1972728 A | 5/2007 |
| CN | 103071195 A | 5/2013 |
| CN | 104507380 A | 4/2015 |
| CN | 104905873 A | 9/2015 |
| CN | 105007973 A | 10/2015 |
| CN | 204709619 U | 10/2015 |
| CN | 105307582 A | 2/2016 |
| CN | 105662647 A | 6/2016 |
| CN | 105726163 A | 7/2016 |
| CN | 106232059 A | 12/2016 |
| CN | 109862835 A | 6/2019 |
| CN | 113040865 A | 6/2021 |
| DE | 202009001951 U1 | 4/2010 |
| DE | 102009056450 A1 | 6/2011 |
| DE | 102010010849 A1 | 9/2011 |
| DE | 102010014778 A1 | 10/2011 |
| DE | 102010024085 A1 | 12/2011 |
| DE | 102011014586 B3 | 9/2012 |
| DE | 20 2020 107013 U1 | 1/2021 |
| EP | 2301450 A1 | 3/2011 |
| EP | 2628455 A1 | 8/2013 |
| EP | 3302312 A1 | 4/2018 |
| EP | 3335647 A2 | 6/2018 |
| EP | 3 420 978 A1 | 1/2019 |
| EP | 4049704 A2 | 8/2022 |
| GB | 2498349 A | 7/2013 |
| JP | 9-19438 A | 1/1997 |
| JP | 2001-321447 A | 11/2001 |
| JP | 2006-026423 A | 2/2006 |
| JP | 2018-501038 A | 1/2018 |
| JP | 2018-171349 A | 11/2018 |
| WO | WO 93/04722 A2 | 3/1993 |
| WO | WO 94/24926 A1 | 11/1994 |
| WO | 97/14466 A1 | 4/1997 |
| WO | WO 97/27808 A1 | 8/1997 |
| WO | WO 97/38631 A1 | 10/1997 |
| WO | WO 99/16499 A1 | 4/1999 |
| WO | WO 99/20335 A1 | 4/1999 |
| WO | WO 99/56801 A2 | 11/1999 |
| WO | WO 99/60933 A1 | 12/1999 |
| WO | 00/33907 A1 | 6/2000 |
| WO | WO 01/21077 A1 | 3/2001 |
| WO | WO 02/02162 A2 | 1/2002 |
| WO | WO 02/11627 A2 | 2/2002 |
| WO | WO 02/43616 A2 | 6/2002 |
| WO | WO 02/070061 A1 | 9/2002 |
| WO | WO 02/094111 A2 | 11/2002 |
| WO | WO 03/002006 A1 | 1/2003 |
| WO | WO 03/018085 A2 | 3/2003 |
| WO | WO 03/030751 A1 | 4/2003 |
| WO | WO 03/051448 A2 | 6/2003 |
| WO | WO 2004/028571 A1 | 4/2004 |
| WO | WO 2004/056275 A1 | 7/2004 |
| WO | WO 2005/000130 A1 | 1/2005 |
| WO | WO 2005/027751 A1 | 3/2005 |
| WO | WO 2005/027779 A2 | 3/2005 |
| WO | WO 2006/021407 A2 | 3/2006 |
| WO | WO 2006/031410 A2 | 3/2006 |
| WO | WO 2006/107641 A2 | 10/2006 |
| WO | WO 2006/135823 A2 | 12/2006 |
| WO | WO 2007/054307 A2 | 5/2007 |
| WO | WO 2007/068424 A2 | 6/2007 |
| WO | WO 2008/034615 A2 | 3/2008 |
| WO | WO 2008/051431 A1 | 5/2008 |
| WO | WO 2008/131116 A1 | 10/2008 |
| WO | WO 2009/019664 A1 | 2/2009 |
| WO | WO 2009/031338 A1 | 3/2009 |
| WO | WO 2009/076482 A1 | 6/2009 |
| WO | WO 2009/086482 A2 | 7/2009 |
| WO | WO 2009/103125 A1 | 8/2009 |
| WO | WO 2009/105710 A1 | 8/2009 |
| WO | WO 2010/010545 A1 | 1/2010 |
| WO | WO 2010/046897 A1 | 4/2010 |
| WO | WO 2010/075565 A1 | 7/2010 |
| WO | WO 2010/102307 A1 | 9/2010 |
| WO | WO 2010/146581 A1 | 12/2010 |
| WO | WO 2011/013556 A1 | 2/2011 |
| WO | WO 2011/066961 A1 | 6/2011 |
| WO | WO 2011/082319 A1 | 7/2011 |
| WO | WO 2011/095352 A1 | 8/2011 |
| WO | WO 2011/106426 A1 | 9/2011 |
| WO | WO 2011/110316 A1 | 9/2011 |
| WO | WO 2012/052982 A1 | 4/2012 |
| WO | WO 2012/064726 A1 | 5/2012 |
| WO | WO 2012/081020 A1 | 6/2012 |
| WO | WO 2012/110619 A1 | 8/2012 |
| WO | WO 2012/120490 A2 | 9/2012 |
| WO | WO 2012/156924 A1 | 11/2012 |
| WO | WO 2013/016435 A1 | 1/2013 |
| WO | WO 2013/072777 A2 | 5/2013 |
| WO | WO 2013/105099 A2 | 7/2013 |
| WO | WO 2013/109756 A2 | 7/2013 |
| WO | WO 2014/081892 A1 | 5/2014 |
| WO | WO 2014/139845 A1 | 9/2014 |
| WO | WO 2014/169266 A1 | 10/2014 |
| WO | WO 2014/178198 A1 | 11/2014 |
| WO | WO 2014/188300 A1 | 11/2014 |
| WO | WO 2015/061365 A1 | 4/2015 |
| WO | WO 2015/134625 A1 | 9/2015 |
| WO | WO 2015/179324 A2 | 11/2015 |
| WO | WO 2015/179377 A1 | 11/2015 |
| WO | WO 2015/189354 A1 | 12/2015 |
| WO | WO 2016/010995 A1 | 1/2016 |
| WO | WO 2017/004234 A1 | 1/2017 |
| WO | WO 2017/097616 A1 | 6/2017 |
| WO | WO 2018/011627 A1 | 1/2018 |
| WO | 2018/033401 A1 | 2/2018 |
| WO | WO 2018/178979 A1 | 10/2018 |
| WO | WO 2018/193603 A1 | 10/2018 |
| WO | WO 2019/064306 | 4/2019 |
| WO | WO 2019/079296 | 4/2019 |
| WO | WO-2020055908 A1 * | 3/2020 ........ A61B 17/22031 |
| WO | WO 2020/139979 A1 | 7/2020 |
| WO | WO 2021/016213 A1 | 1/2021 |
| WO | WO 2021/162678 A1 | 8/2021 |
| WO | WO 2021/167653 A1 | 8/2021 |

(56) References Cited

FOREIGN PATENT DOCUMENTS

| | | |
|---|---|---|
| WO | WO 2022/020366 A2 | 1/2022 |
| WO | 2022/074423 A1 | 4/2022 |
| WO | 2022/123565 A1 | 6/2022 |

OTHER PUBLICATIONS

Struffert, T., et al. "Intravenous flat detector CT angiography for non-invasive visualisation of intracranial flow diverter: technical feasibility" Eur Radiol 21:1797-1801 (2011).
Extended European Search Report issued in EP Application No. 22 20 5020 dated Mar. 9, 2023.
Extended European Search Report dated Feb. 13, 2023, in corresponding Application No. 22205014.8, and submitted herewith.

\* cited by examiner

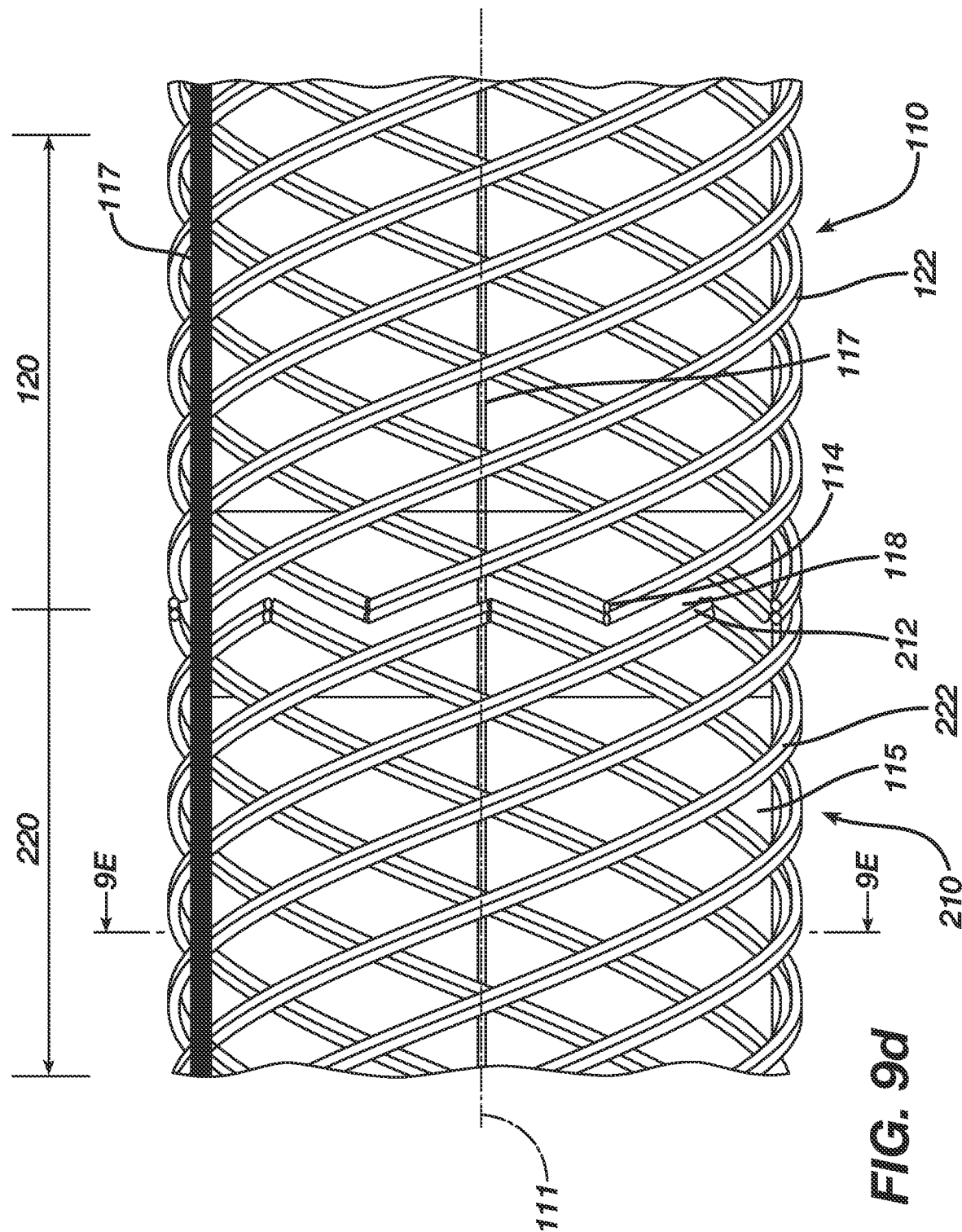

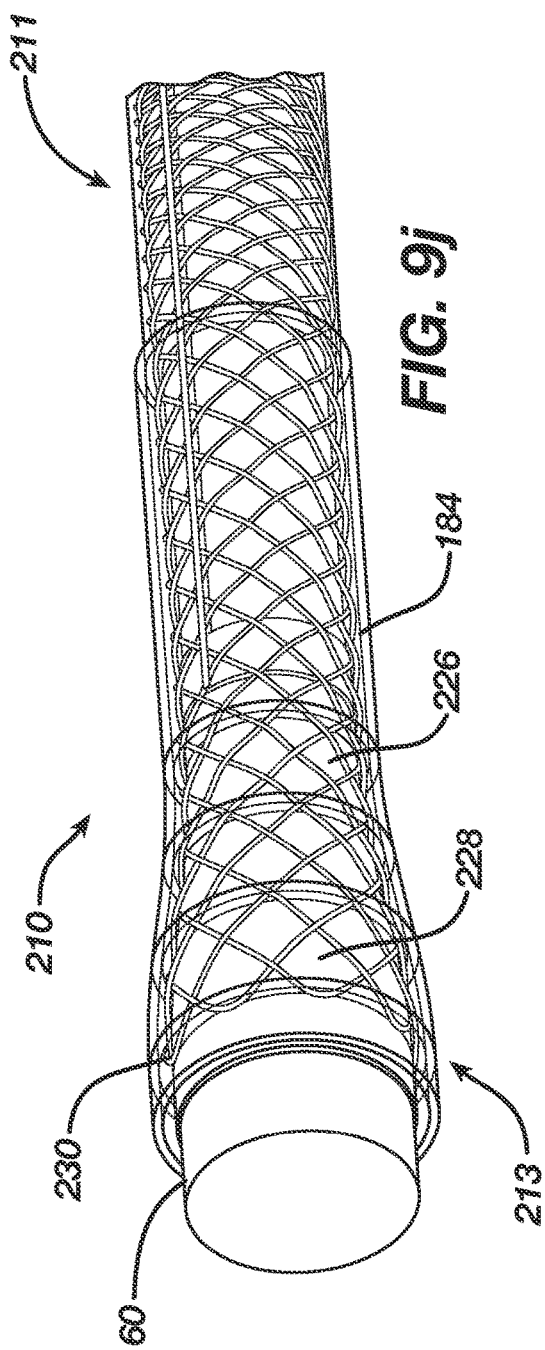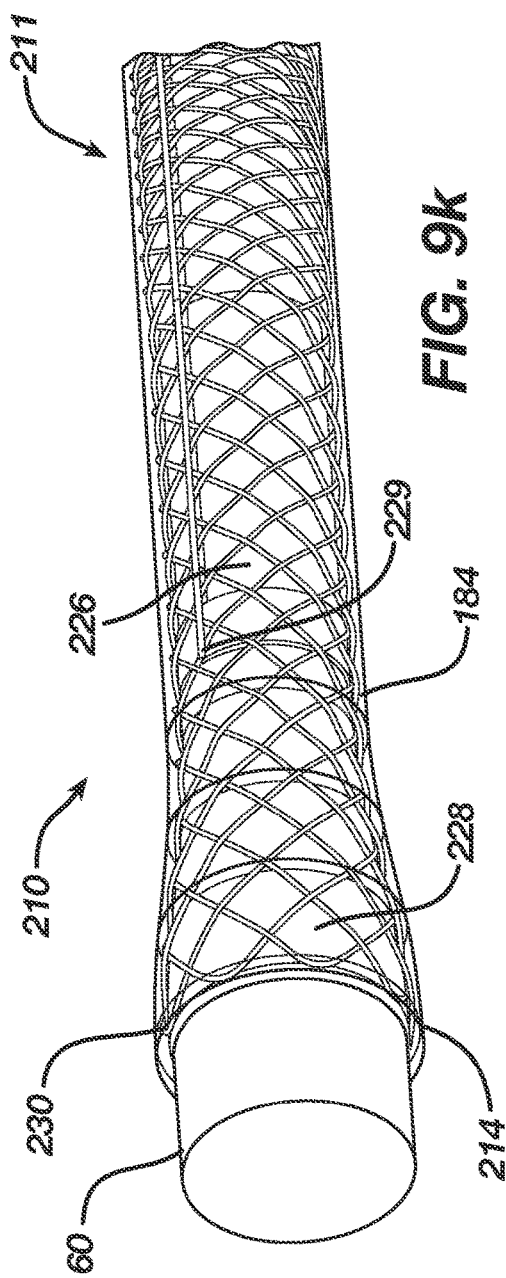

SUPER-BORE CATHETER WITH BRAID SUPPORTED FLARED TIP

FIELD OF INVENTION

The present invention generally relates devices and methods for removing acute blockages from blood vessels during intravascular medical treatments. More specifically, the present invention relates to retrieval catheters with expandable tips into which an object or objects can be retrieved.

BACKGROUND

Clot retrieval aspiration catheters and devices are used in mechanical thrombectomy for endovascular intervention, often in cases where patients are suffering from conditions such as acute ischemic stroke (AIS), myocardial infarction (MI), and pulmonary embolism (PE). Accessing the neurovascular bed in particular is challenging with conventional technology, as the target vessels are small in diameter, remote relative to the site of insertion, and highly tortuous. These catheters are frequently of great length and must follow the configuration of the blood vessels in respect of all branching and windings. Traditional devices are often either too large in profile, lack the deliverability and flexibility needed to navigate particularly tortuous vessels, or are not effective at removing a clot when delivered to the target site.

Many existing designs for aspiration retrieval catheters are often restricted to, for example, inner diameters of 6 Fr or between approximately 0.068-0.074 inches. Larger sizes require a larger guide or sheath to be used, which then necessitates a larger femoral access hole to close. Most physicians would prefer to use an 8 Fr guide/6 Fr sheath combination, and few would be comfortable going beyond a 9 Fr guide/7 Fr sheath combination. This means that once at the target site, a clot can often be larger in size than the inner diameter of the aspiration catheter and must otherwise be immediately compressed to enter the catheter mouth. This compression can lead to bunching up and subsequent shearing of the clot during retrieval. Firm, fibrin-rich clots can also become lodged in the fixed-mouth tip of these catheters making them more difficult to extract. This lodging can also result in shearing where softer portions breaking away from firmer regions of the clot.

Small diameters and fixed tip sizes are also less efficient at directing the aspiration necessary to remove blood and thrombus material during the procedure. The suction must be strong enough such that any fragmentation that may occur as a result of aspiration or the use of a mechanical thrombectomy device cannot migrate and occlude distal vessels. When aspirating with a fixed-mouth catheter, a significant portion of the aspiration flow ends up coming from vessel fluid proximal to the tip of the catheter, where there is no clot. This significantly reduces aspiration efficiency, lowering the success rate of clot removal.

Large bore intermediate and aspiration catheters and/or those with expandable tips are therefore desirable because they provide a large lumen and distal mouth to accept a clot with minimal resistance. The bore lumen of these catheters can be nearly as large as the guide and/or sheath through which they are delivered, and the expandable tip can expand to be a larger diameter still. When a clot is captured and drawn proximally into a tip with a funnel shape, the clot can be progressively compressed during retrieval so that it can be aspirated fully through the catheter and into a syringe or canister. Funnel shaped catheters also lend themselves to better alignment in a vessel, as when the size of the tip is close to that of a vessel the device can self-center. The smaller diameter just proximal of the funnel portion of the tip can allow a hinging motion for bending between the tip and the shaft, in contrast to fixed-mouth designs where there is less freedom of motion and the tip and shaft will tend to move together.

In many examples, the fixed-mouth catheters and those with expandable tips can have an underlying braid as the primary supporting backbone. The use of braids in a catheter body is not a novel concept, and typical examples can be readily found in the art. The braid can often be as simple as bands wrapped spirally in one direction for the length of the catheter which cross over and under bands spiraled in the opposite direction. The bands can be metallic, fiberglass, or other material providing effective hoop strength to reinforce the softer outer materials of the body. However, supporting braids can often lack an effective bonding mechanism for the layers, or have a high sectional stiffness the point where they do not meet the flexibility criteria for many procedures. Additionally, many of these devices have structures which cannot be made soft enough for use in fragile vessels without causing substantial trauma.

Combining the clinical needs of these catheters without significant tradeoffs can be tricky. Catheter designs attempting to overcome the above-mentioned design challenges would need to have a large bore and an expandable tip with sufficient hoop strength in the expanded state to resist aspiration forces without collapse while having a structure capable of folding down consistently and repeatably when retrieved into an outer guide and/or sheath. The tip structure needs to have the flexibility and elasticity to survive the severe mechanical strains imparted when navigating the tortuous vasculature, while also being capable of expanding elastically as a clot is ingested for better interaction with and retention of the clot.

Axially, the tip shape must maintain good pushability so that it can be advanced within an outer sheath, and in the expanded state in a vessel with minimal tendency to further over-expand outward when placed in compression. The tip in the expanded state can also be advanced through vessels that are smaller in diameter, as the funnel shape allows the tip to radially compress when advanced through a narrowing vessel with minimal force. This is advantageous as the tip can seal in a wider range of vessel sizes As a result, there remains a need for improved catheter designs attempting to overcome the above-mentioned design challenges. The presently disclosed designs are aimed at providing an improved retrieval catheter with an expansile tip and methods for fabricating such a catheter capable of improved performance.

SUMMARY

It is an object of the present designs to provide devices and methods to meet the above-stated needs. The designs can be for a clot retrieval catheter capable of removing a clot from cerebral arteries in patients suffering AIS, from coronary native or graft vessels in patients suffering from MI, and from pulmonary arteries in patients suffering from PE and from other peripheral arterial and venous vessels in which a clot is causing an occlusion. The designs can also resolve the challenges of aspirating fibrin rich clot material by addressing the key difficulties of 1) the friction between the clot and the catheter and 2) the energy/work required to deform these firm clots as they are aspirated into the catheter tip.

In some examples, a catheter can be a super-bore catheter having a proximal elongate shaft with a proximal end, a distal end, a large internal lumen, and a longitudinal axis extending therethrough. The elongate shaft can have a low friction inner liner and a first plurality of wire braided segments disposed around the liner. The braided segments can serve as the backbone and support for the catheter shaft. The interlacing weave of the braid can form circumferential rings of cells around the axis of the elongate shaft.

In some examples, the catheter can have a distal tip section extending from the distal end of the elongate shaft. The tip section can be divided into several regions; a proximal tubular body having the same nominal inner diameter as the elongate shaft, and a distal self-expanding tip having a collapsed delivery configuration and an expanded deployed configuration. The tip can be collapsible for delivery through an outer guide sheath and can assume a funnel shape in the expanded deployed configuration. The support for the tip section can be a second plurality of wire braided segments, with the overlapping wires forming circumferential rings of cells. The wires of the second plurality of wire braided segments can follow one spiral direction distally from the proximal end of the tip section, and then invert proximally back on themselves at the distal end to form the other spiral direction of the braid. This inversion of the wires results in atraumatic distal looped hoops at the distal termination of the tip braided segments. In many examples, the first and second wire braided segments can be formed monolithically as a single braid structure.

The catheter can also have one or more axial spine members extending along the longitudinal axis from the proximal end of the first plurality of wire braided segments of the elongate shaft. Spines can resist elongation of the catheter shaft tensile loads during a procedure. The spine can run along the inner surface of the braids, along the outer surface of the braids, or both. In one example, the spine is interwoven through the cells of the braids. In another example, the spine can have a spiral or helical pattern around the axis.

In some examples, the spine or spines can be stiff, solid members of polymeric or metallic materials or can be of compound construction using a core and multiple materials. Other examples, the spine can be a thread or other structure capable of supporting tensile loads but not compressive loads. A thread structure can allow the spine to resist elongation while maintaining excellent lateral flexibility.

In some examples, the spine can invert proximally at a loop point through an opening in a cell of the second plurality of wire braided segments. The spine loop point can be located at a distance proximal of the distal end of the tip section. In one example, this location is approximate the distal end of the inner liner. In another example, the distance can be specified as approximately 4-5 mm proximal of the distal end of the tip section. After inverting at the loop point, the spine can extend proximally for a fixed longitudinal distance and be secured or extend all the way to the proximal end of the elongate shaft.

In other examples, the spine or spines can be solid or semi-solid members of polymeric or metallic materials with compound construction using a core and multiple materials. Alternatively, the spine can be a thread or other structure capable of supporting tensile loads but not compressive loads. In one example, the spine can be a polymeric thread such as a liquid crystal polymer (LCP) which resists tensile elongation but allowing compressive shortening. This spine thread structure can perform its tensile role while contributing very little to the lateral flexibility of the catheter shaft.

In another example, the tensile strength of the assembly can be increased by using novel liners that maintain lateral flexibility and frictional properties of the lumen while offering greatly increased tensile strength. Such liners are readily commercially available and can consist of a wrapped ePTFE structure.

The catheter can have one or more radiopaque marker bands to identify various transition points and terminal ends of the device during a procedure. The marker bands can be platinum, gold, and/or another metallic collar, or alternatively can be coated with a compound giving substantial radiopacity. For example, a distal band can be crimped onto the catheter shaft a distance approximately 10 mm from the distal end of the expandable tip. The axial length between the distal end of the inner liner and the distal end of the tip section can also be between approximately 5 mm and approximately 10 mm. A shorter length can also be contemplated for improved trackability.

One or more of the bands can also be used as structural joints within the catheter shaft. In one example, a proximal marker band at an intermediate length of the catheter shaft can overlap axially with the distal end of the first plurality of wire braided segments and the proximal end of the second plurality of wire braided segments. The bond of the joint can then be formed through welding, adhesives, or other suitable mechanical linkage. If the catheter length is the 1250 mm to 1320 mm of some designs, the second plurality of wire braided segments can have an overall longitudinal length in the range of approximately 100 to approximately 400 mm, thereby positioning the joint with the proximal marker band at an approximate distance within this range from the distal end of the catheter. The overall longitudinal length of the tip section can thus be from approximately 100 up to approximately 400 mm.

The cells of the first plurality of wire braided segments and the second plurality of wire braided segments can be braided in particular patterns to give differing mechanical properties to different portions of the catheter. For example, the angle formed by wire crossover in the cells, and the density in programmable picks per inch (PPI) can be tailored for a higher hoop strength catheter shaft proximally. The angles and PPI can transition an arrangement in the distal tip that has a lower hoop strength to promote deliverability and allow the capacity for additional radial expansion of the tip as a clot is ingested. Moreover, gradual transitions can be made between differing PPI and cell angles to avoid the formation of unwanted kink points of stress concentrations.

In some examples, the first plurality of wire braided segments of the proximal elongate shaft can have a relatively dense picks per inch in a range of approximately 120 to approximately 170. A denser braid with a large cell angle can give good pushability, kink resistance, and bending properties. Alternately, a lower, more flexible PPI of 50-80 can be utilized with a reinforcing wire coil to improve kink resistance while benefiting from lower bending stiffness.

The second plurality of wire braided segments of the expandable distal tip section are capable of radial expansion, and therefore can have variable PPI and cell angles to balance allowable expansion of the funnel tip with radial force capabilities. The second plurality of wire braided segments can have at least a first proximal braid angle and a final distal braid angle smaller than the first braid angle. In some examples, the first and final braid angles can have a range between approximately 65 degrees to approximately 160 degrees.

The final braid angle of the distalmost cells of the second plurality of wire braided segments, which allow the greatest radial expansion, can have a range between approximately 65 degrees to approximately 95 degrees. In some cases the range can even be up to 125 degrees. Proximally, in one design the second plurality of braids can have an initial proximal PPI of approximately 140 and an initial proximal braid angle of approximately 154 degrees. This initial PPI and braid angle for the tip can transition distally to a final braid angle of approximately 65 degrees. In another example, the final braid angle of the tip braids can be approximately 95 degrees up to approximately 125 degrees.

Other properties of wire braided segments can also be tailored for certain properties. In some examples, portions of the first plurality of wire braided segments can have a wire diameter different than at least a portion of the wire diameter in the second plurality of braids. In one instance, the first plurality of braids can have wires having a thickness of approximately 0.0015 inches or some other diameter. The second plurality of braids can have wires with a thickness of approximately 0.0020 inches or some other diameter.

The wires can also assume a non-circular cross-sectional shape or have custom or irregular braid patterns to affect localized properties of the catheter. In one example, the first plurality of braids can have at least one section with a 1 wire under 2 over 2 herringbone pattern and be laser welded at the distal end to the proximal marker band. The second plurality of wire braided segments can have a 1 over 1 half-diamond pattern in at least a portion of the distal tip section and be welded at the proximal end to the proximal marker band.

In some examples, the first and second plurality of wire braided segments can be made from the same material. In other examples, at least a portion of the first plurality of wire braided segments can have wires with a first material composition different than a second material composition in at least a portion of the second plurality of wire braided segments. In one case, the proximal first plurality of wire braided segments can be a stainless steel composition. In another example, the distal wires of the second plurality of wire braided segments can be of Nitinol or another superelastic alloy composition allowing them to be heat set to the desired diameter of the expanded tip during manufacturing and also improve resistance to plastic deformation.

The expandable tip can be designed to be advanced through the vasculature in the expanded state and thus have a range of maximum inner diameters in the deployed configuration. The diameters can be scaled to the nominal inner diameter of catheter French size. In many examples, the expandable tip can have a maximum inner diameter in the expanded state approximately equal to the diameter of a target vessel just proximal of the target clot. In another example, the expanded funnel tip can be sized to have a larger inner diameter than the inner diameter of an outer sheath and/or guide through which it is delivered.

In further examples scaled for a nominal 6 Fr catheter size, the expanded tip can have an inner diameter of approximately 0.070" in the collapsed delivery configuration and a maximum inner diameter in a range of approximately 0.080-0.120 inches in the expanded deployed configuration. In a more specific example, the expanded tip can have a maximum inner diameter in a range of approximately 0.090-0.100 inches in the expanded deployed configuration. Similarly, catheters with shafts in other common sizes, such as 5 Fr or 7 Fr, can also be envisioned with flared tip radial sizes which can scale accordingly, yielding an overall range of approximately 0.075-0.200 inches.

The supporting structure of the elongate shaft and expandable tip can be covered with a plurality of outer polymeric jackets. In some examples, one or more polymer body jackets can be disposed around the elongate shaft and one or more polymer tip jackets can be disposed around the tip section. The tip and shaft outer jackets can be formed together or separately using injection molding, polymer reflow, or other suitable processes.

These outer jackets can have varying durometer hardness to create a proximal portion with more column stiffness and transition into a distal portion with more lateral flexibility. In some examples, the body jackets can have a hardness in the range between approximately 25 to approximately 72 Shore D. The tip jackets can have a distalmost tip jacket with the softest jacket for the most atraumatic vessel crossing profile. In one example, the distalmost tip jacket can have a hardness in the range between approximately 42 Shore A to approximately 72 Shore A.

Different jacket thicknesses can also be used. In one example, at least a portion of the plurality of body jackets can have a first wall thickness less than the wall thickness of at least a portion of the plurality of tip jackets. The increased thickness can aid in compressing the clot and resisting the forces of aspiration.

The distalmost tip jacket can be trimmed to follow the contours of the tip braid or can extend a longitudinal distance distally to overhang beyond the distal end of the hoops of the second plurality of wire braided segments. In some examples, the longitudinal distance of the overhang can be in a range from approximately 0.1 mm to approximately 1.0 mm. In a more specific example, this longitudinal distance can be in a range between 0.40 mm up to approximately 0.6 mm.

The end of the tip can also have a polymeric distal bumper or flared disk extension emanating radially outward from the distal end of the expandable tip. The disk extension can have a flare angle relative to the longitudinal axis. In one example the flare angle can be approximately normal to the longitudinal axis or can lean proximally or distally. In some examples, the disk extension can be configured to flexibly invert proximally as the catheter is advanced distally through a target vessel. The extension can contact and seal with the vessel wall to direct aspiration power to the clot face.

A method for manufacturing a catheter can be disclosed. The method can include arranging an inner liner around a first application mandrel. The method can also involve positioning one or more axial spines on the outer surface of the inner liner parallel to the longitudinal axis. In some examples, a proximal marker band can be located at an intermediate axial location between the proximal end and the distal end of the inner liner on the application mandrel. A proximal support tube braid can be disposed around at least a proximal portion of the inner liner and axial spine on the application mandrel.

In some examples, the method can then include threading a distal tip section braid over the at least a distal portion of the inner liner and axial spine on the application mandrel. The distal tip section can have a proximal tubular body, a distal expandable tip, and a plurality of wire braided segments making up circumferential rings of cells. The wires of the plurality of braided segments can be inverted to loop back through the braid pattern of the braided segments and form atraumatic distal hoops on the distalmost ring of cells. The distal tip section braid can be constructed to have a longitudinal length in the range of approximately 100 to approximately 400 mm With the proximal support tube braid and distal tip section braid in place, the method can entail welding the distal end of the support tube braid and the proximal end of the tip section braid to the proximal marker band. In other examples, the braids can be bonded to the marker band using adhesives.

The axial spine can be configured in multiple ways with the braid. In some examples, at least a portion of the spine can extend beneath the braids of the proximal support tube braid and distal tip section braid, over the braids, or some combination of these. In another example, at least a portion of the spine can be woven into the braids by threading through the cells. A further step can then involve inverting a distal portion of the axial spine proximally to form a loop through an opening in the wire braided segments of the distal tip section braid and extending the inverted portion of the axial spine proximally. The loop can be formed at the distal end of the tip section braid or some distance proximal thereof.

The method can then include the step of reflowing or laminating one or more proximal outer polymer jackets to the support tube braid. In some examples, the outer jackets can extend beyond the proximal marker band and onto at least a proximal portion of the distal tip section braid.

A distal inner jacket can be positioned on a flared mandrel designed with the profile of the expanded distal tip. The method can include removing the application mandrel and back-loading the flared mandrel proximally into the distal tip section braid. Another step can then be placing a distal soft elastic jacket over the frame of the distal tip and laminating the jacket to the frame to fuse with the distal inner jacket.

In some examples, the soft elastic jacket of the distal tip section braid can be fused with the one or more proximal outer polymer jackets of the elongate shaft. A further step can involve forming a flexible polymeric lip or disk extending radially from the distal elastic jacket of the distal tip. When these forming steps are complete, the method can then include the step of removing the flared mandrel from the catheter assembly. With the flared mandrel removed, an additional step can include applying an inner hydrophilic coating to the interior and/or exterior of the distal tip assembly.

Other aspects of the present disclosure will become apparent upon reviewing the following detailed description in conjunction with the accompanying figures. Additional features or manufacturing and use steps can be included as would be appreciated and understood by a person of ordinary skill in the art.

BRIEF DESCRIPTION OF THE DRAWINGS

The above and further aspects of this invention are further discussed with reference to the following description in conjunction with the accompanying drawings, in which like numerals indicate like structural elements and features in various figures. The drawings are not necessarily to scale, emphasis instead being placed upon illustrating principles of the invention. The figures depict one or more implementations of the inventive devices, by way of example only, not by way of limitation. It is expected that those of skill in the art can conceive of and combine elements from multiple figures to better suit the needs of the user.

FIGS. 9a-9l illustrate steps of a method for the construction of a catheter according to aspects of the present invention.

DETAILED DESCRIPTION

Specific examples of the present invention are now described in detail with reference to the Figures, where identical reference numbers indicate elements which are functionally similar or identical. The examples address many of the deficiencies associated with traditional clot retrieval aspiration catheters, such as poor or inaccurate deployment to a target site and ineffective clot removal.

The designs herein can be for a super-bore clot retrieval catheter with a large internal lumen and a distal funnel tip that can self-expand to a diameter larger than that of the guide or sheath through which it is coaxially delivered. The designs can have a proximal elongate body for the shaft of the catheter, and a distal tip with an expanding braided support structure and outer polymeric jacket to give the tip atraumatic properties. The braided support can be designed so that the expansion capability is variably focused in an axial portion of the tip section. The braid cells can be capable of easily and repeatably collapsing for delivery and expanding for good clot reception and resistance under aspiration. Sections of the tip can have the ability to further expand beyond the free shape of the expanded deployed configuration when ingesting a clot. The catheter's braid and tip designs can be sufficiently flexible to navigate highly tortuous areas of the anatomy and be able to recover its shape to maintain the inner diameter of the lumen when displaced in a vessel.

Accessing the various vessels within the vasculature, whether they are coronary, pulmonary, or cerebral, involves well-known procedural steps and the use of a number of conventional, commercially-available accessory products. These products, such as angiographic materials, mechanical thrombectomy devices, microcatheters, and guidewires are widely used in laboratory and medical procedures. When these products are employed in conjunction with the devices and methods of this invention in the description below, their function and exact constitution are not described in detail. Additionally, while the description is in many cases in the context of thrombectomy treatments in intercranial arteries, the disclosure may be adapted for other procedures and in other body passageways as well.

Figure 1:
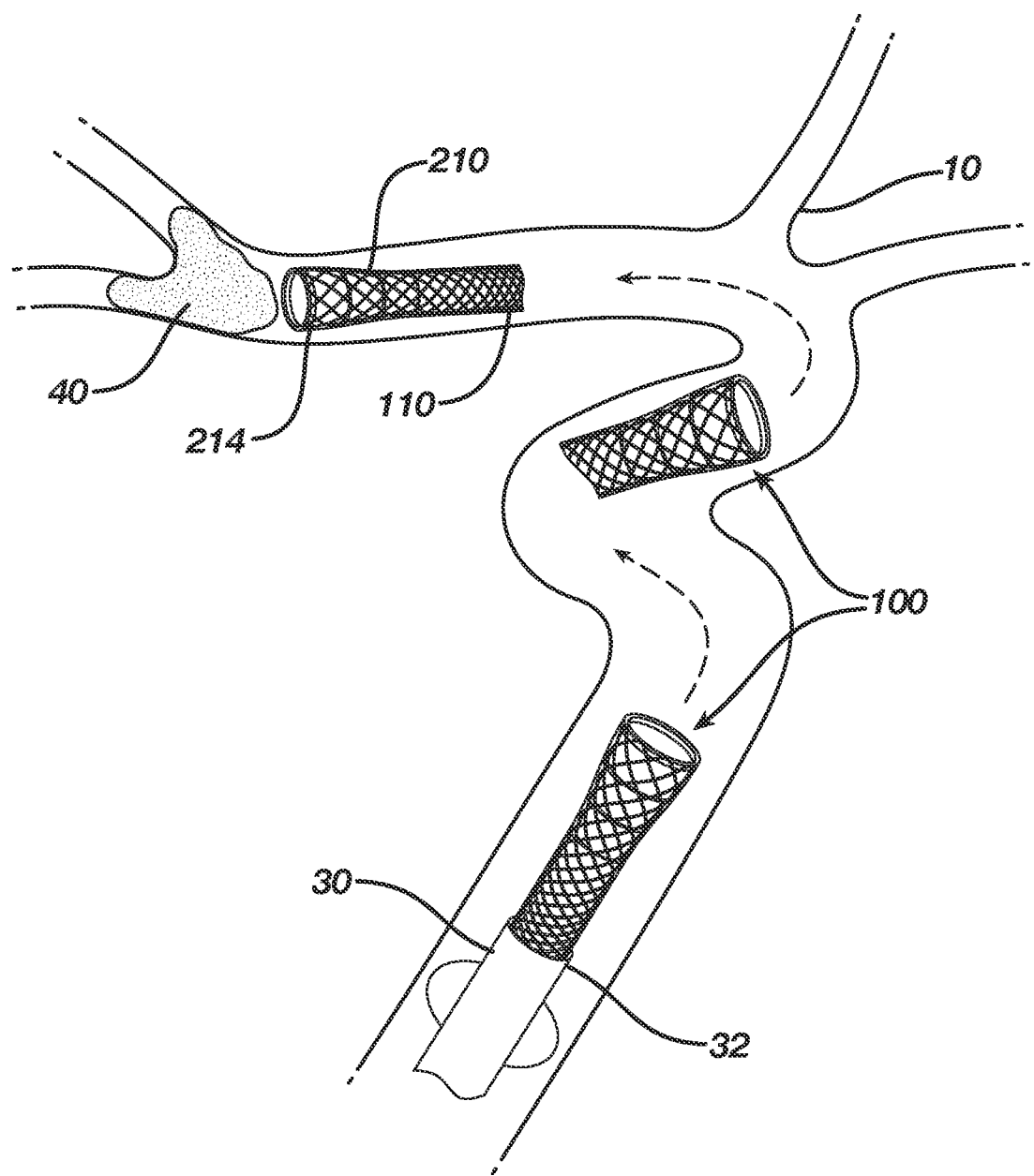
FIG. 1 is a view of a large bore clot retrieval catheter with an expandable tip being advanced through the vasculature according to aspects of the present invention.

Turning to the figures, FIG. 1 illustrates a possible sequence for approaching an occlusive clot 40 using a large bore clot retrieval catheter 100 of the designs disclosed herein. The clot 40 can be approached with the catheter 100 collapsed within a guide sheath 30 or other outer catheter for delivery. When the vasculature 10 becomes too narrow and/or tortuous for further distal navigation with the guide sheath 30, the catheter 100 can be deployed for further independent travel distally. The catheter 100 can be highly flexible such that it is capable of navigating the M1 or other tortuous regions of the neurovascular system to reach an occlusive clot.

The clot retrieval catheter 100 can have a flexible elongate body 110 serving as a shaft with a large internal bore (which in some cases can be 0.090 inches or larger) and a distal tip section 210 having a collapsible supporting braided structure. The large bore helps the catheter to be delivered to a target site by a variety of methods. These can include over a guidewire, over a microcatheter, with a dilator/access tool, or by itself.

In most cases, the design of the collapsible funnel tip can be configured so that the catheter 100 can be delivered through (and retrieved back through) commonly sized outer sheaths and guides. For example, a standard 6 Fr sheath/8 Fr guide, would typically have an inner lumen of less than 0.090 inches. The tip can then be designed with a collapsed delivery outer diameter of approximately 0.086 inches. The tip can self-expand once advanced to an unconstrained position distal to the distal end 32 of the guide sheath 30, capable of reaching expanded outer diameters as large as approximately 0.132 inches. As the catheter can be delivered independently to a remote occlusion, the tip section 210 must be designed to be able to resist collapse from the forces of aspiration, have excellent lateral flexibility in both the expanded and collapsed states, an atraumatic profile to prevent snagging on bifurcations in vessels, and conformability to allow self sizing should the tip need to be advanced through vessels with a diameter smaller than the tip and track past calcified plaque without dislodging it.

Figure 2:
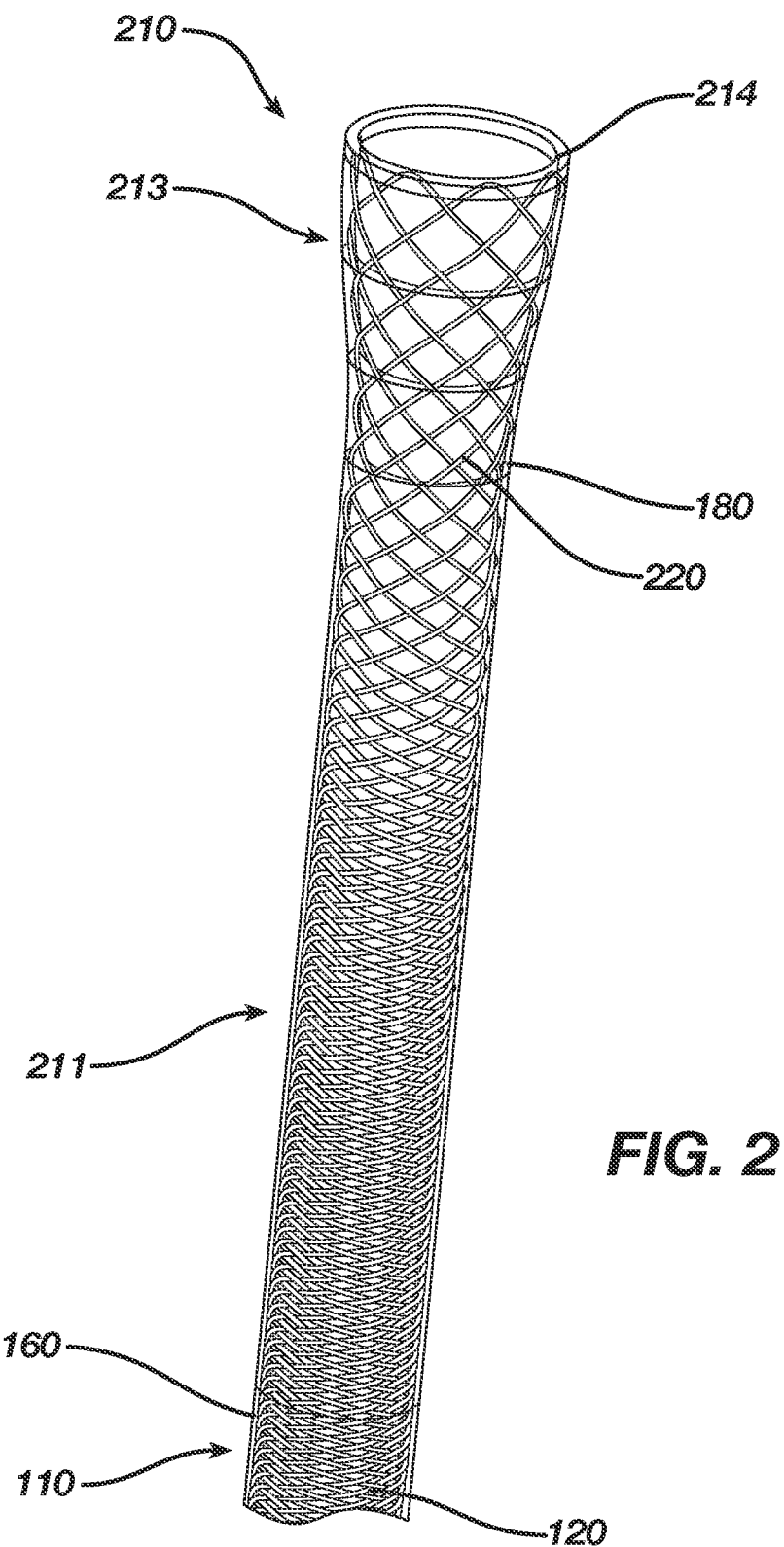
FIG. 2 illustrates the distal portion of a large bore clot retrieval catheter with an expandable tip according to aspects of the present invention.

A closer view of the distal portion of the catheter with the tip section 210 in the expanded deployed configuration as a funnel is illustrated in FIG. 2. The elongate shaft 110 can have a backbone consisting of a first plurality of braid sections 120 enclosed by an axial series of outer body jackets 160. As used herein, "braided sections" can refer to segments within a single monolithic braid that have different physical properties and/or configurations and does not necessarily mean two distinct structures bonded together.

Similarly, the tip section 210 can have another series of braided sections 220 surrounded by one or more polymeric tip jackets 180. It can be appreciated that different braided sections of the tip and shaft braids can have different geometries and weave patterns to achieve desired properties for that segment of catheter. It is also appreciated that the tip section braid can extend for the full length of the catheter so that a separate proximal braid is not required.

The tip section 210 can have a first substantially tubular proximal portion 211 and a second distal expansile portion 213. Changes to the braid properties can be more pronounced in the expansile portion 213 to allow for radial expansion when the catheter is deployed largely funnel shape and, in some cases, additional expansion when a large, stiff clot is swallowed into the distal mouth of the tip. The length and contour of the funnel portion of the expansile section 213, as tapering from the distal end 214, can be also adjusted by through heat set of the braid wires by designing the elastic free shape. A short funnel can maintain good hoop stiffness and flexibility through having a shorter lever distance to hinge off the elongate shaft 110. A short funnel can also be tailored to minimize stretch and deformation in the more distal of the outer polymer jackets 180. Alternatively, a longer funnel with a shallower taper can better interact with and more gradually compress a clot over the length to reduce the risk of lodging.

The tip shape and outer jackets 180 can block some of the proximal fluid from entering the expanded tip during aspiration and retrieval of the clot, allowing for more efficient direction of the aspiration force and prevention of the distal migration of clot fragments or other debris during the procedure. The jacket 180 can be formed from a highly-elastic material such that the radial force exerted by expanding the expansile tip is sufficient to stretch the membrane to the funnel shape contours of the tip when in the expanded deployed configuration. One example can be using a ductile elastomer which has the advantages of being soft and flexible with resistance to tearing and perforation due to a high failure strain. Alternately, the jacket can be baggy and loose and fold over the support frame edges so that the frame can move more freely when expanded and collapsed.

Figure 3:
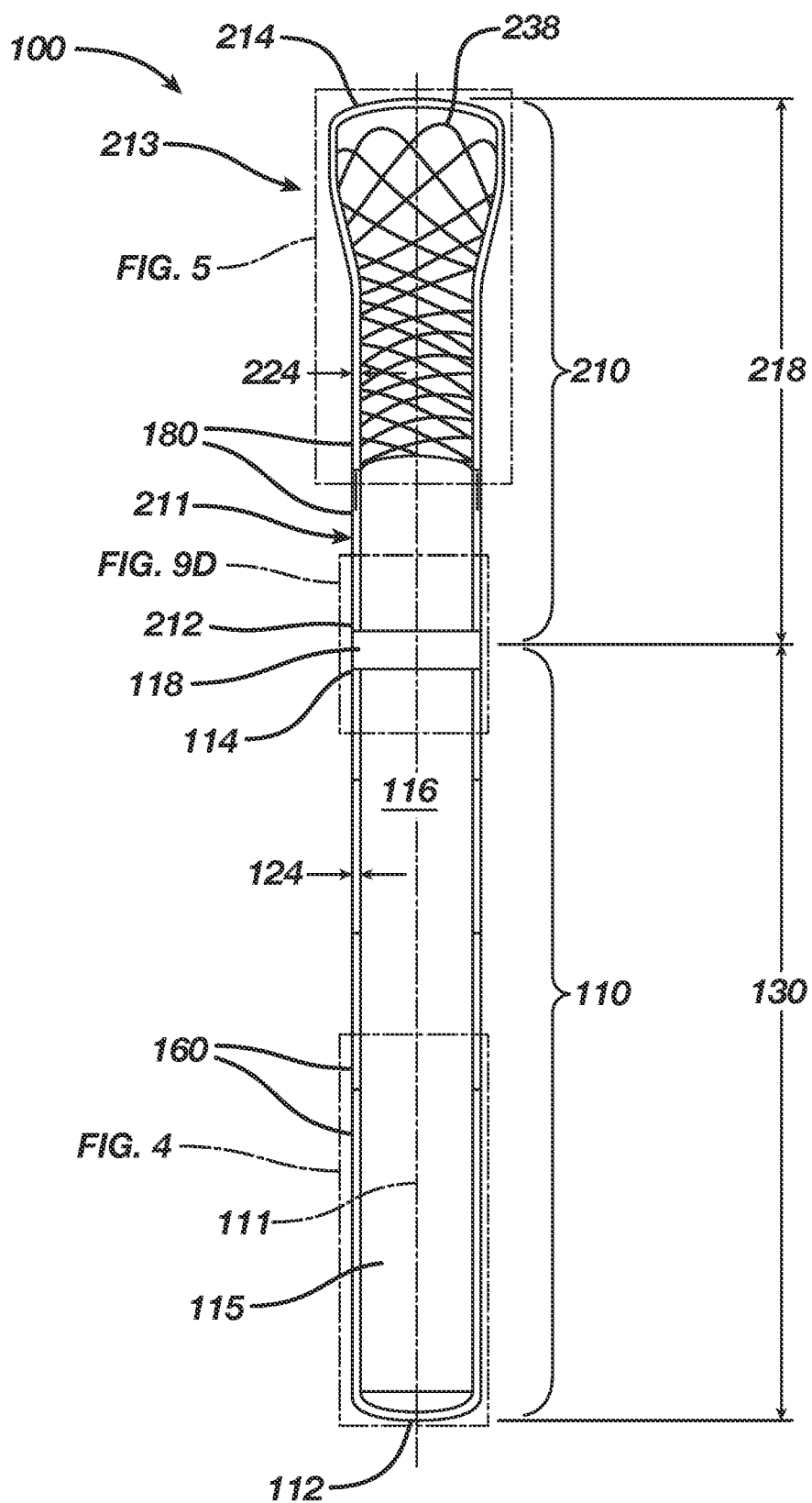
FIG. 3 shows a cutaway view of a large bore clot retrieval catheter according to aspects of the present invention.

FIG. 3 shows a cutaway view of a design for an aspirating clot retrieval catheter 100. The catheter 100 can have a proximal tubular elongate shaft 110 configured around a longitudinal axis 111. The elongate shaft 110 can have an underlying braided support structure (not shown for clarity) defining the catheter lumen 116, which can have a low friction inner liner 115 and be used for the delivery of auxiliary devices, contrast injection, and direct distal aspiration to a clot face. Preferred liner materials can be polytetrafluoroethylene (PTFE), wrapped ePTFE, or similar materials. A distal tip section 210 can have a self-expandable expansile section 213 that is effectively spring-loaded within the outer sheath when collapsed for delivery. The shaft 110 and tip section 210 can be concentric with the longitudinal axis 111 and share the same approximate diameter for smooth delivery through an outer sheath. The shaft 110 can have a length 130 and the tip section 210 can have a length 218.

The outer surface of the elongate shaft 110 can be a series of five or six outer polymeric body jackets 160. The jackets can be made of various medical grade polymers, such as Chronoprene, NEUSOFT™, Engage, polyether block amide (PEBAX®), or Nylon. Materials can be chosen, for example, so that progressively more proximal segments are generally harder and less flexible (by durometer hardness, flexure modulus, etc.) for pushability as the proximal end of the catheter is approached. The body jackets 160 can be reflowed over the underlying braid and allowed to flow through the interstitial spaces of the braid cells to bond the layers of the construct together. The jackets can be butted together to form a continuous and smooth outer surface for the catheter shaft.

The distal tip section 210 can be subdivided into two or more regions, depending on the expansion characteristics allowed by the underlying braid. A proximal tubular section 211 can have largely the same profile and diameters as the elongate shaft 110 and transition into a distal expansile section 213 designed to passively expand when deployed from the outer sheath and/or guide. The tip section can have one or more outer tip jackets 180, with the hardness of the jackets becoming progressively less as the distal end 214 of the section is approached to give the catheter a soft, atraumatic end.

The wires of the underlying braid can be wound in one direction from the proximal end 212 of the tip section distally. Upon reaching a distal terminus, the wires can be inverted 238 to form distal hoops 230 and wind proximally in the opposite direction. As a result, the inverted ends are also more atraumatic as the free ends of the wires exist only at the proximal end 212 of the braid. This contrasts with, for example, other catheter designs where the braided reinforcing sections resemble a stent with wire free ends existing on both opposing ends of the device. The braid designs disclosed herein have the additional advantage of ensuring the sum of wires wrapped in one direction will necessarily be equal to those wound in the opposite direction, preventing any helical curl which could otherwise exist in the catheter as a result of any imbalance.

Differing braid patterns for the elongate shaft 110 and tip section 210 provide specific mechanical properties to the finished device. Some patterns can offer kink resistance and burst strength but can lack pushability. Other patterns offer greater torquability and scaffolding support for the outer jackets at the cost of some flexibility. Still other patterns can give excellent flexibility and energy dispersion.

Additionally, other factors can be tuned as well. The catheter does not necessarily have to have two discrete braided sections for the shaft and distal tip. One three, four, or more discrete sections of differing flexibility can be used. Choices for other physical parameters, such as wall thickness and material composition, can also be implemented for the various catheter sections. For example, the stiffer and more proximal outer body jackets 160 can have a wall thickness 124 of approximately 0.004 inches to maintain column stiffness in the longitudinal direction without compromising much lateral flexibility. Ideally, there will be at least 0.00025", and more preferably 0.0005" to 0.0015", of jacket material residing above the braid wires to ensure braid wires are fully encapsulated, with the inner surface of the braid being in contact with or residing no more than 0.002", and more preferable 0.0005", in diameter above the liner. More distal tip jackets 180 can have a slightly increased wall thickness 224 of approximately 0.006 to give the expandable tip an additional atraumatic cushion where very soft jacket materials are used. The thicker wall also allows for material to reside both below and above the braid wires for full encapsulation where no liner is used. Liners are best avoided for the tip section as standard liners are not elastomeric and may plastically deform through expansion and compression. It is appreciated that an elastomeric linear could be used for the tip section that is of a different hardness to the outer jacket of the tip section.

Radiopaque marker bands can be included at different axial points along the length of the catheter 100 for visibility under fluoroscopy during a procedure. In the example illustrated, a marker band 118 can illuminate the proximal end 212 of the tip section 210 to give an attending physician an indication of where the expandable capacity of the catheter begins. The band shown can be platinum strip or other noble metal with a relatively short length of between approximately 0.025-0.030 inches and a thin wall thickness (approximately 0.0005 inches) to minimize the impact on flexibility and the outer diameter of the catheter.

The braid of the tip section and shaft section can be formed monolithically as a single braid structure. In other examples, the band 118 can provide the linking structure for the proximal and distal portions of the catheter 100 between the proximal end 212 of the braid of the tip section 210 and the distal end of elongate shaft 110. This joint can allow different material and complex braid configurations to be used for the proximal and distal portions of the catheter and linked for a relatively low manufacturing cost and higher yields. It also allows for the braids of the proximal elongate shaft 110 and tip section to be quickly manufactured separately to any of a number of desired lengths. If the catheter length is the typical 1350 mm of many designs, the tip section 210 can be approximately 100 mm in length, leaving a 1250 mm shaft terminating in a proximal luer. For more complex geometries or a more gradual stiffness transition, the tip section can be up to approximately 400 mm in length bonded with an 850 mm shaft at a more proximal marker band 118 location.

In another embodiment, DFT platinum-filled wires can be used for at least one of the distal tip braid wires to make the tip radiopaque under fluoroscopy. Alternatively, radiopaque coils or bands can be threaded around the atraumatic loops to provide visibility to the tip.

Figure 4:
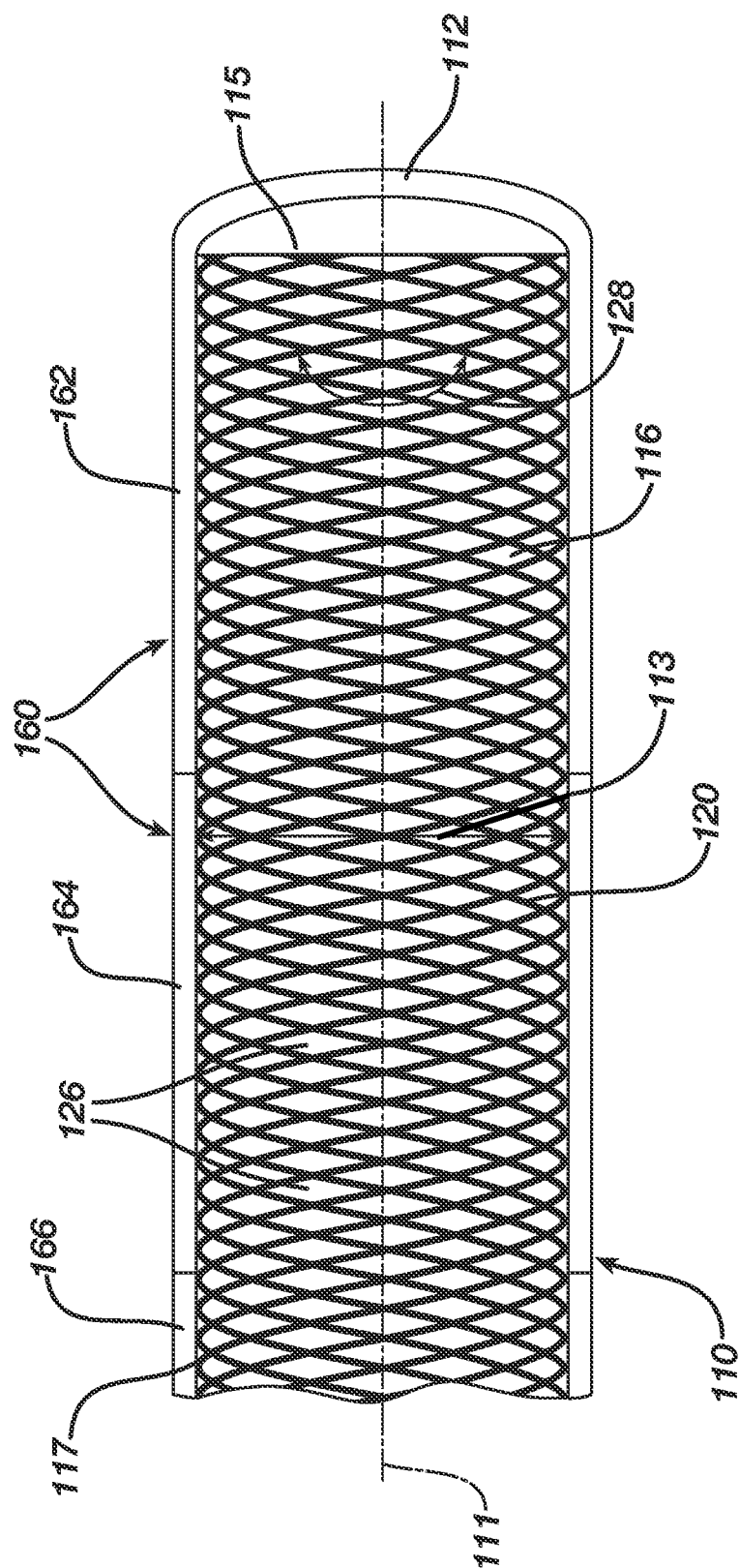
FIG. 4 depicts the proximal end of the large bore clot retrieval catheter of FIG. 3 according to aspects of the present invention.

FIG. 4 depicts a cross section of the most proximal region of the elongate shaft 110. The plurality of braided segments 120 making up the support for the shaft can have a relatively dense weave with circumferentially elongated rings of cells 126 providing good scaffolding for the greater stiffness of the more proximal body jackets 160. The braid segments 120 can be dimensionally stable such that half the wires are wound in one direction (for example, clockwise) while the other half of the wires are wound in the opposing direction. The structure can have other supporting members, such as helical coils extending underneath the braid, to resist tensile elongation and offer improved kink resistance. The braid segments 120 can have a first braided segment braid angle 128.

An inner liner 115 can provide a low friction inner surface without any sagging or other structural protrusions into the interior lumen 116 during aspiration. Alternately, wrapped ePTFE liners can be used to provide a low friction inner surface while also giving the structure high tensile strength to resist tensile elongation. In addition to or instead of the inner liner 115, hydrophilic coatings on one of both of the inner and outer surfaces of the shaft can also be used.

As mentioned, the elongate shaft 110 and tip section 210 can be sized to be compatible with relatively low-profile access sheaths and catheters, so that a puncture wound in the patient's groin (in the case of femoral access) can be easily and reliably closed. For example, the catheter 100 can be required to pass through the lumen of a sheath or guide with an inner diameter of less than 0.110 inches, preferably 0.090 inches, in some cases less than 0.087 inches, and most preferably less than 0.085 inches. Therefore, the catheter shaft can have an overall delivery profile with an inner diameter 113 of approximately 0.070-0.072 inches (0.084 inch or 2 mm outer diameter), and yet be able to expand its distal tip and mouth to the size of the vessel approximate where the clot is located, which could be as large as 5 mm.

The kink resistance of the shaft is in part due to the structure of the braided segments 120 in cooperation with the outer polymer body jackets 160. Adjusting the braid PPI, pitch, and cell angle, combined with pre-stretching or shortening other liner and/or outer jacket materials, can effectively set the longitudinal stiffness and the force required to bend different sections of the shaft. The braided segments 120 of the proximal shaft can have a PPI in a range from approximately 120 to approximately 170. Torqueability and kink resistance can be gained by using stainless steel wires in a diamond two-over-two pattern where two wires side by side alternately pass under two wires, then over two other wires. A herringbone pattern, or flattened wires, can also be utilized for a lower profile cross section. For example, flat braids can reduce the profile while offering a similar stiffness to a round braid of the same cross sectional area. For braid-only shafts, a reduced PPI can be used to increase flexibility for approximately the most distal 5 mm to 20 mm of the shaft.

Alternately, for braided segments 120 with reinforcement (such as coils), a lower density (for example, 60 PPI for a 0.071" ID shaft) braid can be maintained from there or varied. Coiled support can be stopped away from the start of the funnel taper of the expandable tip so the structures can hinge between the funnel taper start and the rest of the shaft.

The jackets 160 can transition distally to progressively softer materials in a stepwise fashion for added flexibility. By way of example and not limitation, the shaft portion shown can have a most proximal jacket 162 which can span a significant distance (approximately 1000 mm) from the proximal end 112 and be PEBAX®, TR 55, ML 21, Nylon 12, or similar material having a hardness of approximately 72 or 85 Shore D. The next, more distal jacket 164 can span approximately 60 mm and be composed of PEBAX® or similar elastomer with a hardness in the range of 63D. The third jacket 166 can extend a further 50 mm and be PEBAX® of about 55D. It is appreciated that jacket lengths can be varied for the different sections to achieve a design that is optimal for most anatomies.

One or more axial spines 117 can be used as an additional link between the shaft body and the tip. The spine or spines 117 can counteract tensile elongation and contribute to the push characteristics of the shaft. This can be especially beneficial for the expandable tip as a large stiff clot can become lodged at the distal end of the catheter and can subject it to large tensile forces as the catheter is retracted into a larger outer sheath for removal from the vessel. The spine can be positioned beneath the braid, threaded between weaves of the braid, located on the outer diameter of the braid, or some combination of these. The spine can be composed of metallics, a polymeric, or composite strands such as Kevlar. In some preferred examples a liquid crystal polymer (LCP), such as Technora, can be utilized which is easy to process and offers high tensile strength without sacrificing any lateral flexibility.

Figure 5:
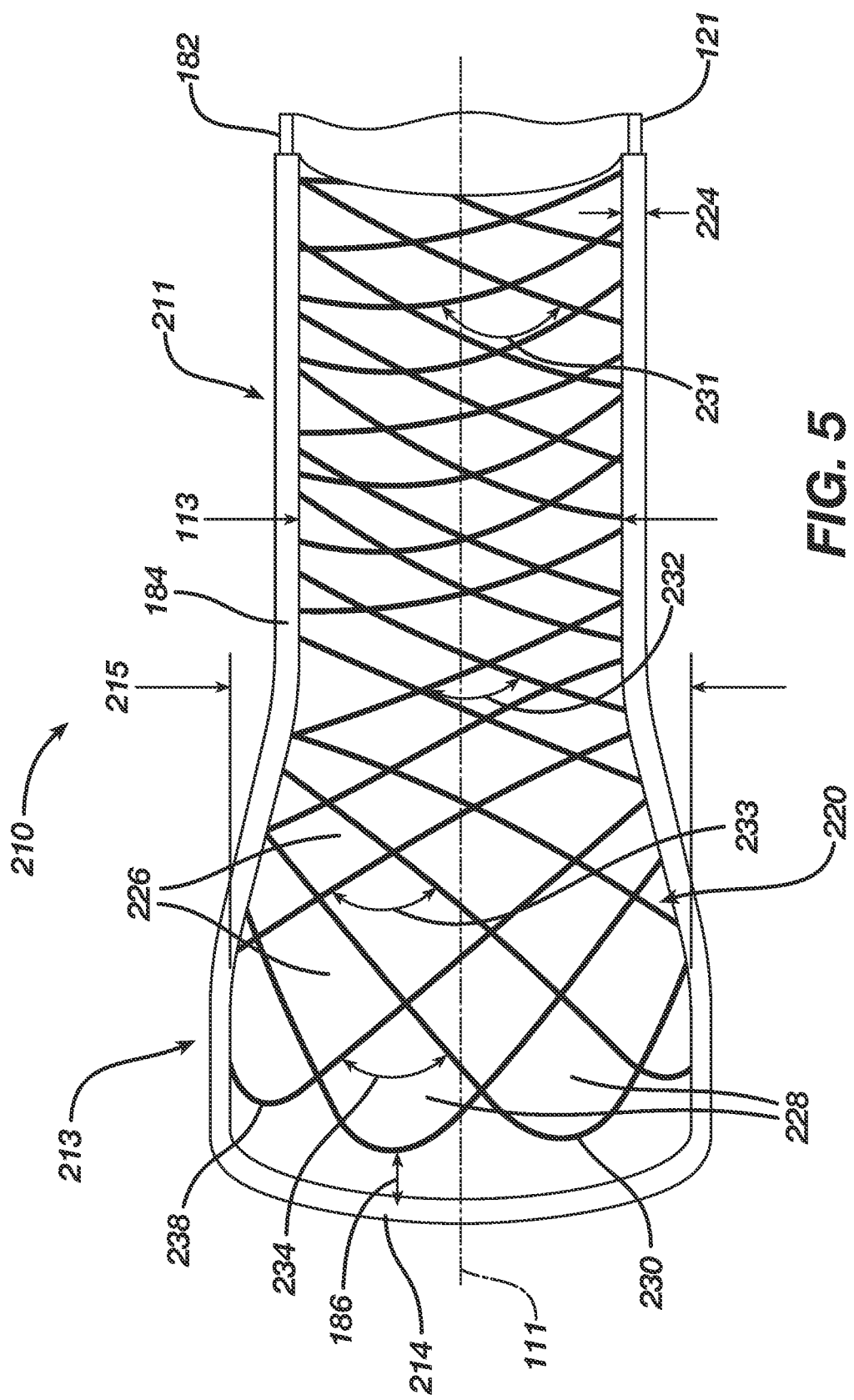
FIG. 5 shows the distal end of the large bore clot retrieval catheter of FIG. 3 according to aspects of the present invention.

A magnified partial cross section view of an example internal configuration for the tip section 210, post-expansion, for the large bore catheter is depicted in FIG. 5. The more proximal tubular portion 211 of the section can have approximately the same inner diameter 113 of the elongate shaft 110 while the more distal portion can be expanded to a larger inner diameter 215 at or near the distal end 214. The plurality of braids 220 can provide good scaffolding for the outer jackets 182, 184, especially in regions where a particularly soft and highly flexible polymer or blend with less structure is chosen.

The wires of the braided sections 220 can be Nitinol or another shape memory superelastic alloy so that the solid state phase transformations can be designed to dictate the constrained deliver and unconstrained deployed diameters of the tip. The braid can thus have an inner diameter 113 approximate that of the catheter bore when constrained and be heat set to a free shape with a larger inner diameter 215 for when the catheter 100 is deployed from the outer sheath. The wires can also be drawn filled tubing (DFT) shape memory alloy with a platinum core such that the braid is visible under fluoroscopy. A further benefit of using a superelastic material for the braid wires is that the catheter walls can be relatively thinner without sacrificing performance characteristics such as flexibility or crush strength, adding robustness to tortuous bends for the tip section 210.

The inner diameter 215 of the expanded tip 210 will vary based on the nominal diameter of the catheter. A catheter with an inner diameter 113 of approximately 0.070" in the collapsed state can have a tip section 210 with a maximum inner diameter 215 of approximately 0.090 inches in the expanded deployed configuration. Similarly, catheters with shafts in other common sizes, such as 5 Fr up to 9 Fr, can also be envisioned with flared tip diameters 215 which scale accordingly, for an overall range of approximately 0.075-0.200 inches.

As discussed previously, the braid wires can invert 238 proximally back upon themselves as shown to form distal hoops 230 at the distal end 214 of the tip braid sections 220. This forms the braid in a one over one half-diamond pattern where a single wire passes under, then over another single wire. Fewer wires can thus be used as each individual wire will form a hoop 230. The hoops eliminate any potential of braid ends migrating through the polymer encapsulation during use. Two or more wires can also be tied together as one for additional reinforcement in the braid.

It is possible that the entire catheter supporting braid (i.e. both the elongate shaft 110 and tip section 210) can be a single monolithic braid of one material extending from the proximal end 112 to the distal end 214 with hoops 230. However, it is difficult to manufacture the looped distal hoops 230 with a braid that is greater than 1300 mm in length with reasonable yield rates. It is much more feasible to manufacture a distal tip section 210 having braids 220 that are at most 400 mm long and join to simple proximal braids 120 of the elongate body. Nitinol braid wires like those of the tip can be used for the proximal braids, but less expensive stainless steel wires can perform in these regions for stiffness and with less cost.

The plurality of braids 220 making up the tip section 210 can form circumferential rings of closed cells 226. The cells 226 can deform as the braid wires slide relative to one another, and are capable of elongating circumferentially with respect to the axis 111 when the distal expansile section 213 is radially expanded to the deployed configuration, and elongating axially (flattening) with respect to the longitudinal axis when the expansile section is reduced to the collapsed delivery configuration for advancement (or when the tip is withdrawn back into an outer sheath). The cells 226 can be substantially diamond shape to allow the vertices to facilitate more uniform deformation/expansion as shown or take some other profile if the braid wires follow a non-linear pattern.

The crossover of the braid wires form braid angles 231, 232, 233, 234 at the vertices of each of the cells 226, which help define the expansile capabilities of different portions of the tip. In addition to the heat set shape memory providing the funnel-shaped profile for the tip, variations in the cell angles allows for further expansion of the tip during clot aspiration. Generally, the braid angles can become smaller and more acute as the distal end 214 is approached to aid in allowing greater expansion for interacting with and receiving a clot. This is important because a clot must be deformed in order to fit into the catheter lumen, and firm clots with high coefficients of friction do not tend to deform and reshape easily and thus do not readily conform to the passive shape of the catheter tip. Reactive expansion can allow the catheter tip to effect a seal and consequent suction grip on the clot so that it can be retracted to safety.

Nominal angles can be chosen to balance the desired competing capabilities of the tip (delivery and target site performance). Smaller braid angles yield greater expansion capability to conform to the contours of a large or firm, fibrin-rich clot as it is ingested. This added expansion allows for better clot management and reduces the risk of shearing when compared to other tips with stiffer, less compliant frames or those utilizing stiffer polymeric materials. Further, smaller angles offer less resistance to collapse and better force transmission when transiting through an outer guide sheath. However, these characteristics can come at the cost of some flexibility and radial force to resist tip collapse during aspiration.

Alternately, high braid angles (where the wires are aligned more radially) can provide better compressive hoop strength in an expanded state to resist collapse of the tip under aspiration. More obtuse cell angles can also limit the ability of the expanded tip to over-expand radially in compression when the catheter 100 is being advanced through a vessel independently (after deployment from the guide sheath). This can help the expanded tip avoid snagging in vessels, particularly in tight bends and when being pushed through vessels of progressively smaller diameters. However, the radial force can complicate the collapse of large cell angles for delivery through and retraction into the guide sheath, the friction causing the catheter to bind or be otherwise undeliverable. Furthermore, the folding of large angles requires elongation of the expansile section 213 of the tip which, if excessive, can potentially exceed the elastic limit of the distal tip jacket 184.

A distal marker band 121 approximately 0.8 mm in length can be included just proximal of the distalmost tip jacket 184 to give radiopacity near the distal end 214. The marker band 121 can be platinum or another suitable noble metal and can be crimped over the axial spine (not shown) and the braid of the tip section can extend over the band. The band 121 can also be situated at or near the distal end 119 of the inner liner 115 at least 5 mm and up to 10 mm from the distal end 214 of the tip section 210.

To be compatible with many of the most widely adopted guides and/or sheaths, the inner diameter 113 of the catheter elongate shaft 110 and the expanded inner diameter 215 of the expandable tip section 210 can be sized and scaled appropriately. For example, a 5 Fr catheter targeting vessels approximately 2.0 mm in diameter can have a shaft inner diameter 113 of approximately 0.054 inches and an expanded tip inner diameter 215 in a range from approximately 0.068-0.090 inches. Similarly, a 6 Fr catheter targeting vessels approximately 2.3-3.4 mm in diameter can have a shaft inner diameter 113 of approximately 0.068-0.074 inches and an expanded tip 210 inner diameter 215 in a range from approximately 0.090-0.120 inches. A larger 8 Fr catheter for less remote clots can have a shaft inner diameter 113 of approximately 0.082-0.095 inches and an expanded tip 210 inner diameter 215 in a range from approximately 0.090-0.188 inches. The upper bounds of the expanded tip diameter 215 is limited by delivery forces when traversing within an outer guide or sheath. These common sizes can result in the ratio of the inner diameter 113 of the elongate body 110 to the maximum expanded inner diameter 215 of the flared tip 210 being in a range from approximately 0.55-0.90.

To create a more atraumatic vessel crossing profile, the distalmost tip jacket 184 can extend for a distance 186 to overhang beyond the distal hoops 230 of the tip section braids 220. The distance can be in a range of approximately 0.1-1.0 mm or, more preferably, 0.5-0.8 mm. The jacket 184 can be the softest of those on the catheter and can cover approximately the distal 90 mm of the length. In one example, NEUSOFT™ with a hardness of approximately 62 Shore A can be reflowed to form the distalmost tip jacket 184. In some cases, an even softer layer of approximately 42 Shore A can be used.

Figure 6:
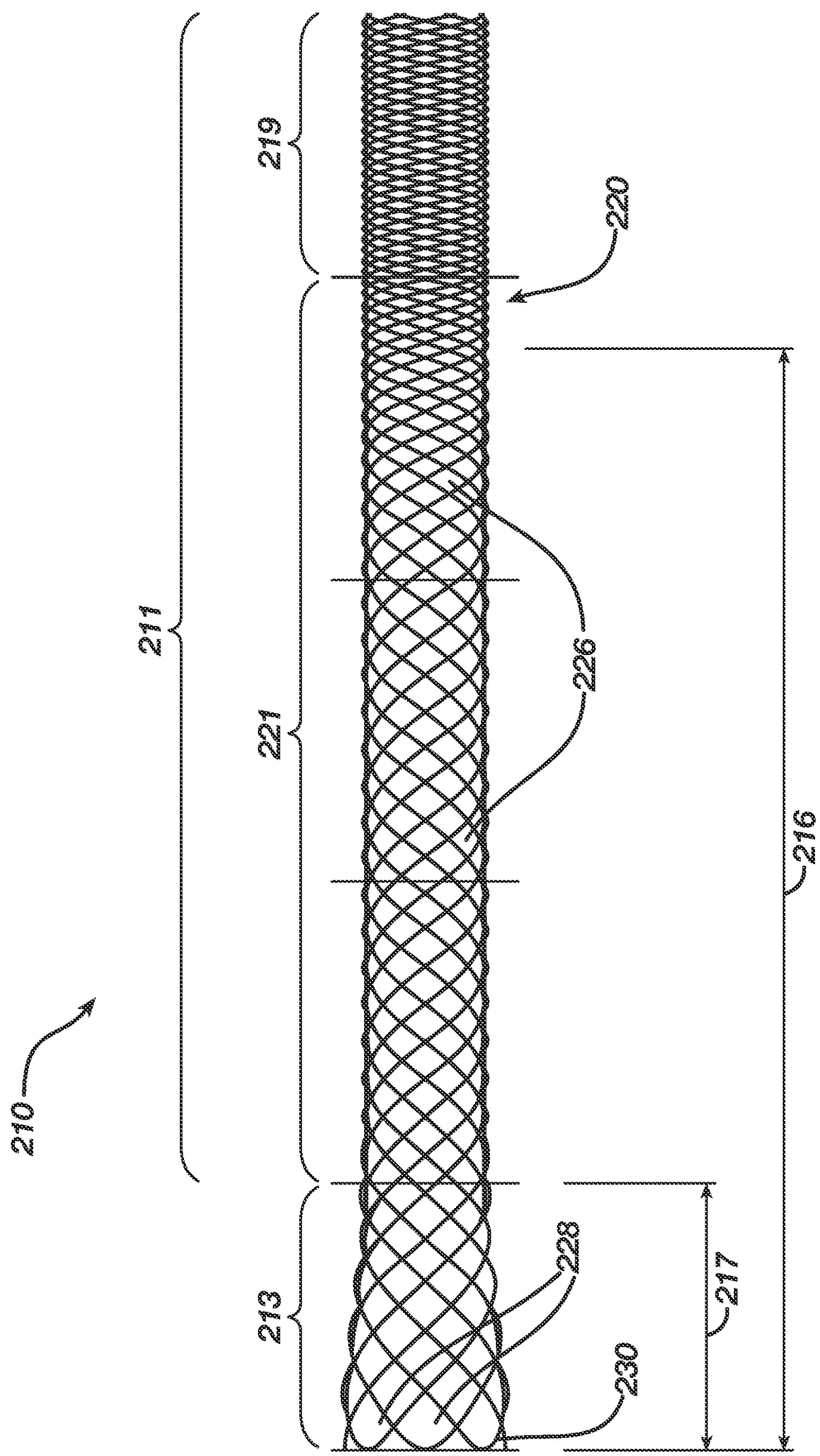
FIG. 6 illustrates an example braid configuration for the distal tip section according to aspects of the present invention.

The example illustrated in FIG. 6 shows how the plurality of braided sections 220 making up the tip section 210 can have variable PPI and braid angles. Sixteen Nitinol wires in the one over one half-diamond pattern can be used to produce eight distal hoops 230. More proximal sections can have a greater PPI than more distal regions. Generally, the PPI of the braid will have an inverse relationship with the expandability of a particular section of the tip 210. Regions with a larger PPI can have greater flexibility but limited expansion capability. Similarly, regions with lower PPI values can trade hoop strength for markedly greater expansion capability.

The braided sections 220 can be sub-classified into segments by the braid characteristics and their contribution towards the expansion capabilities of that segment. The braid in a most proximal section 219 can be the "stiff" or "more proximal" section as described herein. An intermediate expansile section 221 can alternately be desired as a "intermediate" or "mid" section. Similarly, the distal expansile section 213 with the greatest radial expansion capability can be referred to as the "least stiff" or "more distal" section.

The distalmost cells 228 can have the smallest cell angle corresponding to the greatest expansion capability. FIG. 6 illustrates a final cell angle of 85 degrees, but designs having angles from 65 up to 125 degrees have been contemplated. The braid angles of the distal expansile section 213 can increase proximally to 100 degrees over the length 217 of this section. The intermediate expansile section 221 can have a tubular profile with a gradual progressive increase in cell angle (for example to 105 degrees and eventually to 154 degrees) and PPI (from approximately 40 up to 140) proximally to allow localized expansion as an ingested clot transits the section and is further compressed. This pattern can be maintained in the proximal section braid 219 for the remainder of the tip section 210.

Designs can have expansile sections with axial lengths 216 that are relatively long (for example, between approximately 5 mm and 10 mm) for the best clot management characteristics as a longer section can ingest and compress more of a clot. Alternatively, the length 216 can be kept short (for example, between approximately 1 mm and 5 mm) for improved hoop strength and trackability. Generally, it has been found that braid angles of 110 degrees or lower gives radial expansion under compression, with lower angles offering greater expansion capability. Therefore, the length 216 of the expansion zones can be tailored by changing the distances at which angles of 125 degrees or lower are maintained. Alternatively, the expansion zone can have a variable braid angle over a length.

Figure 7:
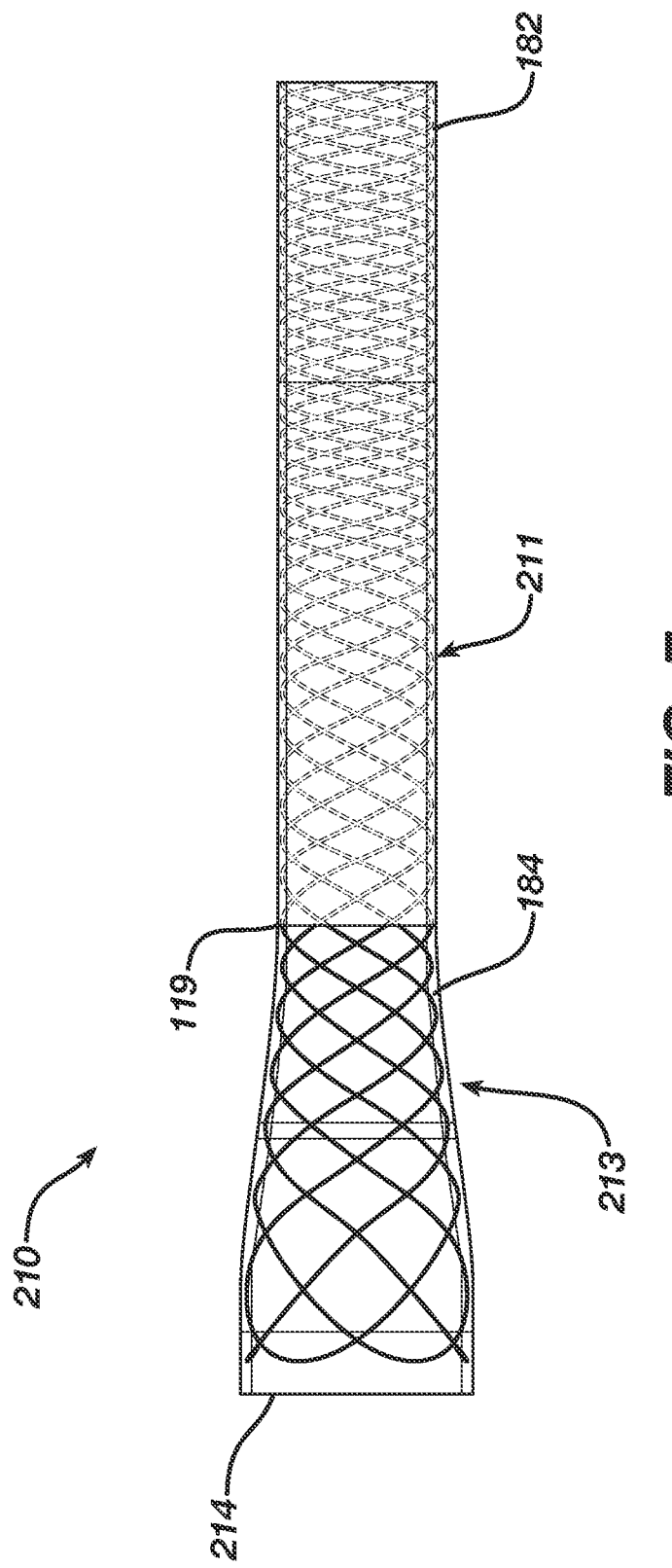
FIG. 7 is another example of a braid configuration for the distal tip section according to aspects of the present invention.

The braid of the tip section 210 in FIG. 6 is shown with outer jackets 182, 184 applied in FIG. 7. The inner liner 115 can terminate some distance proximal of the distal end 214 of the tip section 210. The final tip jacket 184 can cover the distal 90 mm if the tip section. The next proximal outer jacket 182 can be approximately 30-50 mm in length and be PEBAX® with a hardness in the region of 20-25 Shore D. It is appreciated that jacket lengths can be adjusted to provide a catheter with optimal transitions for particular anatomical destinations and are not limited to the lengths discussed in this application.

In some examples, to allow for smooth delivery of the clot retrieval catheter through an outer catheter, the outer surface of the outer jackets 182, 184 can be coated with a low-friction or lubricious material, such as PTFE or commercially available lubricious coatings such as offered by SURMODICS™, HARLAND™, BIOCOAT® or COVALON™. Similarly, the inner surface of the catheter lumen can also be coated with the same or similar low-friction material for the passage of auxiliary devices and to aid in a captured clot being drawing proximally through the catheter with aspiration and/or a clot retrieval device.

Figure 8:
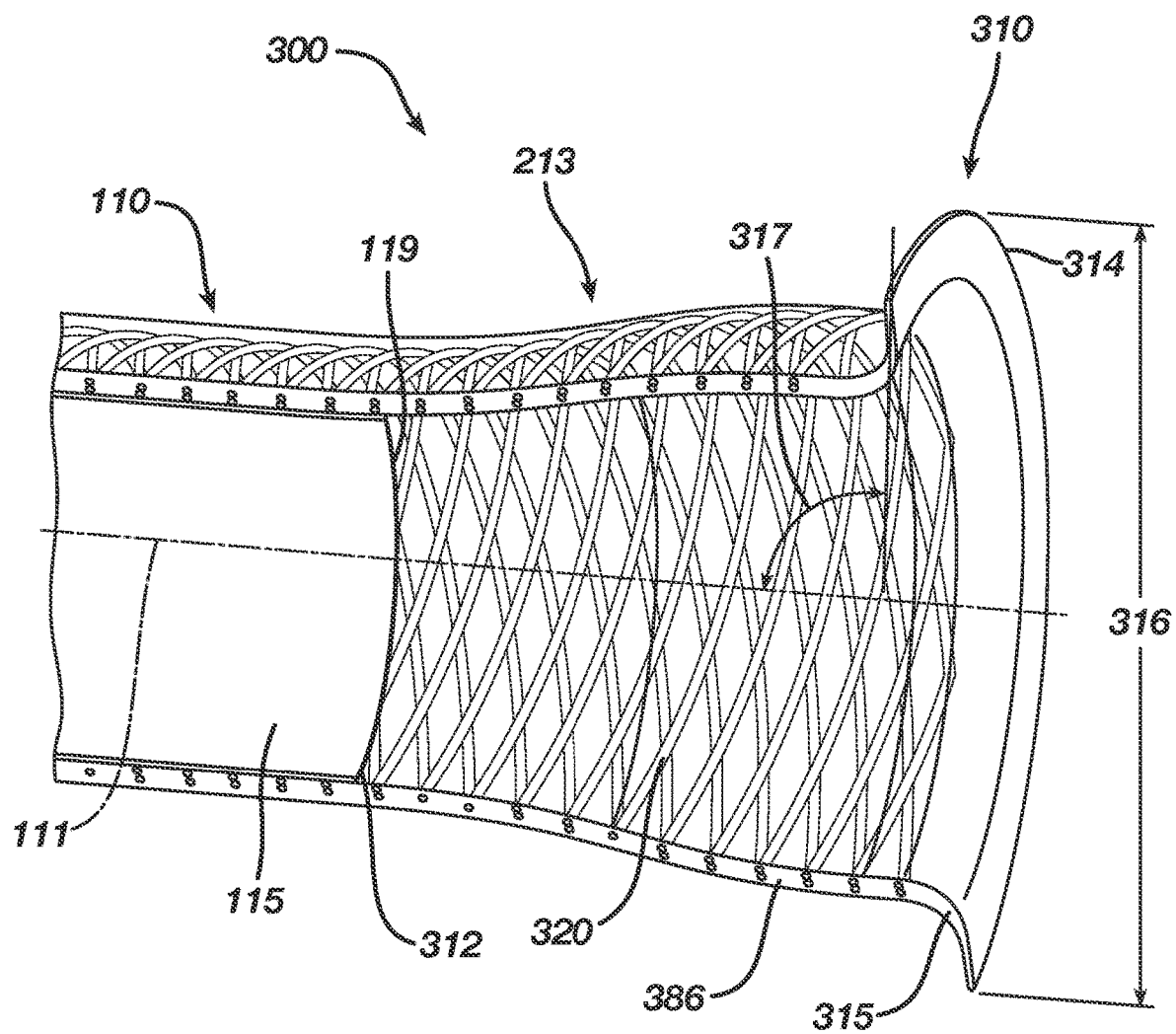
FIG. 8 is a view of an expanded distal tip section with a disk extension according to aspects of the present invention.

A flared polymer disk extension 315 can be provided at the large end of the distal expansile section 213 of the flared tip 310 of a catheter 300 to further increase the outer diameter of the flared braid structure, as depicted in FIG. 8. This provides a large aspiration mouth, having a distal end 314 and a proximal end 312, while also giving a flexible seal lip to interface with the walls of a vessel. The disk can be thin and flexible with shape memory properties, such as with elastomeric materials. The braided structure 320 gives the expansile section 213 sufficient radial force to withstand the forces of aspiration while the unsupported disk extension 315 will have atraumatic properties to gently contact and seal with the vessel walls. The braided structure 320 can be supported by a distal outer jacket support 386. The disk extension allows the outer diameter of the device to seal in large vessels while minimizing the volume of polymer-encapsulated braid that needs to be collapsed through an outer guide sheath for delivery and removal from a vessel. Although disk extension 315 can form an angle 317 perpendicular to the longitudinal axis 111 as manufactured, the angle can vary in a substantial range. For example, the unsupported disk can invert proximally to allow the catheter to be advanced distally within the vessel without causing trauma. In other examples, the disk extension can lean proximally or distally.

The disk extension 315 can be formed through molding or by reflowing the polymer over a flared mandrel that includes a step profile to shape the lip. The profile can be wrapped or compressed in the distal direction prior to loading into an outer guide sheath. Once advanced from the guide sheath and deployed, the disk can pop and contact the vessel walls as the catheter is advanced into progressively narrower paths. Another advantage of such a design is that the disk extension 315 can easily be collapsed for delivery, but the sharp angle formed on deployment means the disk will not have a tendency to be vacuumed into the mouth of the catheter during aspiration which could otherwise cause an obstruction. The disk can also be provided in various diameters 316 that can be tailored to perform in set ranges of vessel diameters. For example, a 3 mm outer diameter disk can be tailored for vessels with an inner diameter of 2 to 3 mm. Similarly, a 7 mm outer diameter disk can be tailored for 4 to 7 mm diameter vessels.

It should be noted that any of the herein disclosed catheters designs can also be used with one or more stentrievers. The combined stentriever retraction and efficient aspiration through the enlarged tip section in the expanded deployed configuration can act together to increase the likelihood of first pass success in removing a clot. The catheter can also direct the aspiration vacuum to the clot face while the stentriever holds a composite clot (comprised of friable regions and fibrin rich regions) together preventing embolization and aid in dislodging the clot from the vessel wall. The funnel-like shape of the tip section can also reduce clot shearing upon entry to the catheter and arrest flow to protect distal vessels from new territory embolization.

Figure 9A:
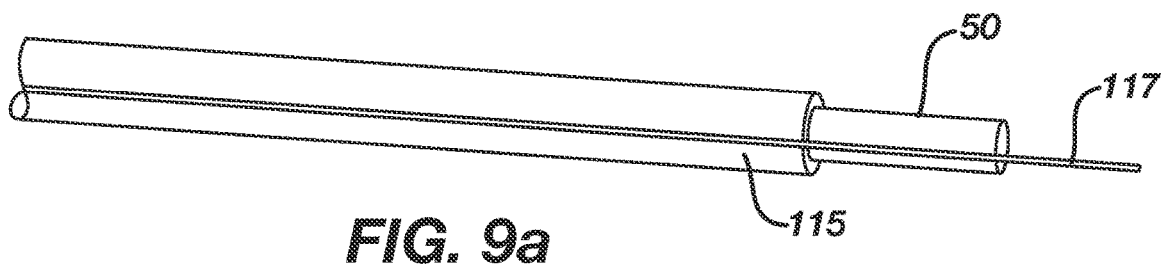
Figure 9B:
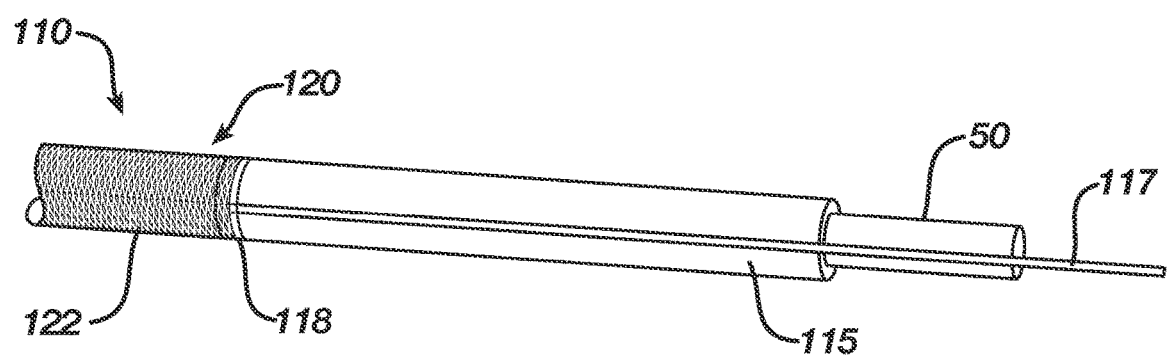
Figure 9C:
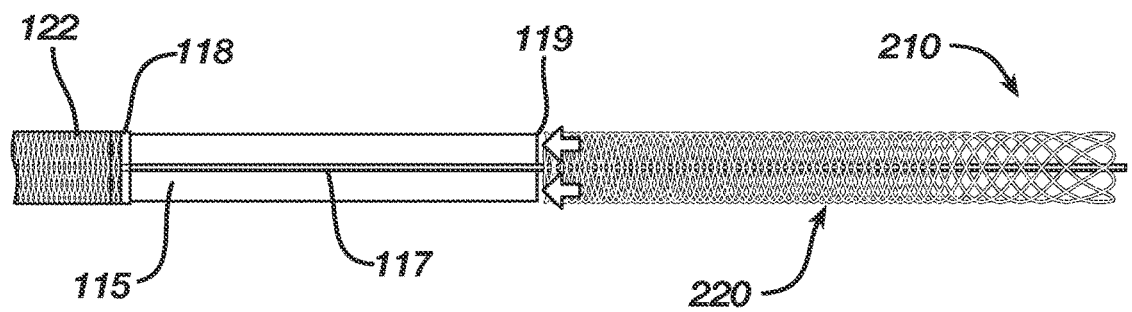
Figure 9E:
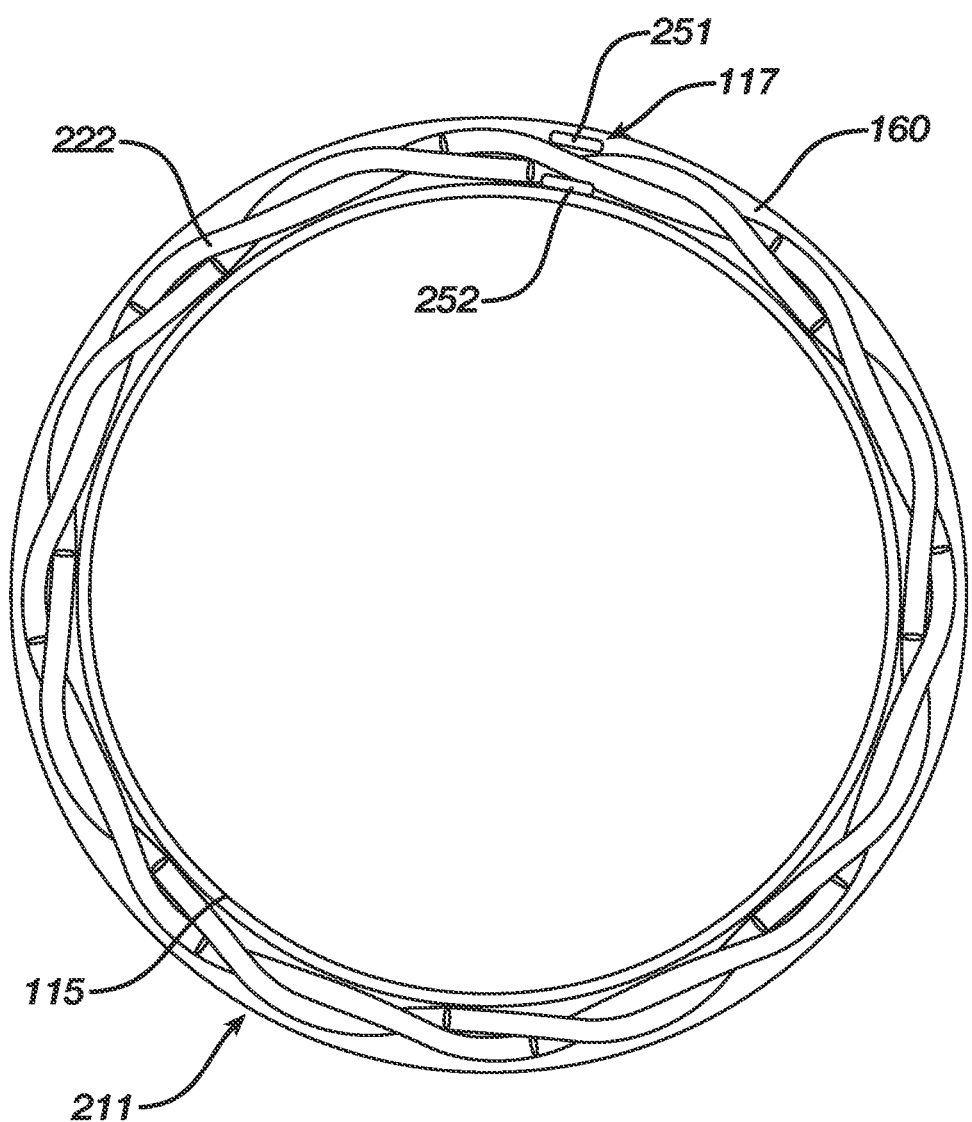
Figure 9F:
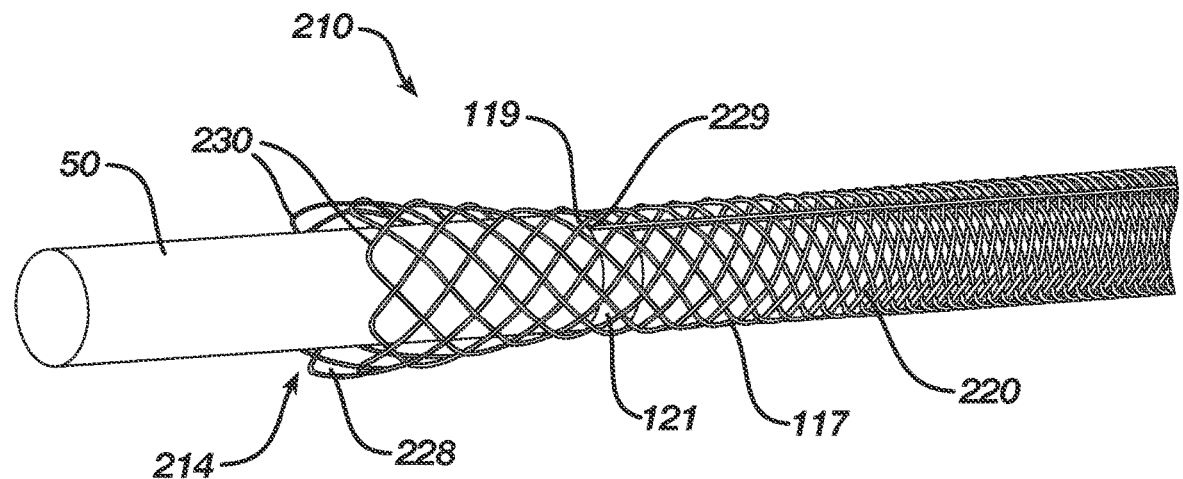
Figure 9G:
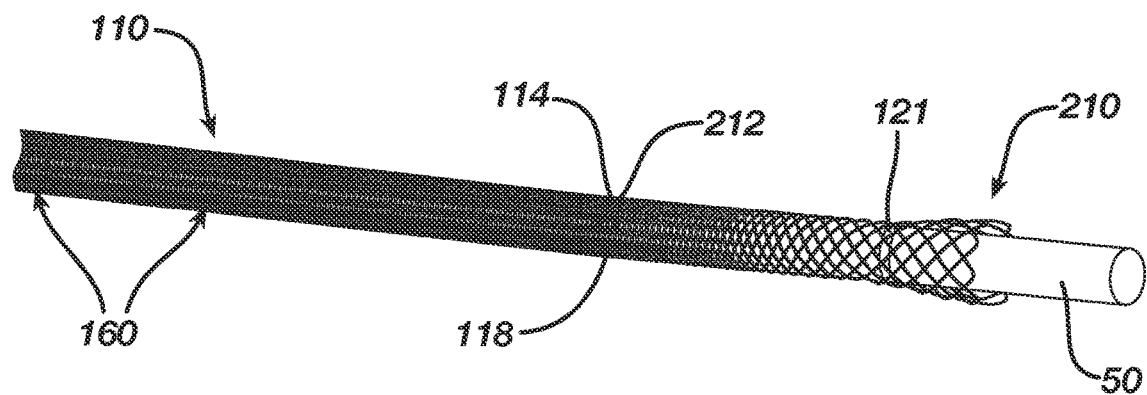
Figure 9H:
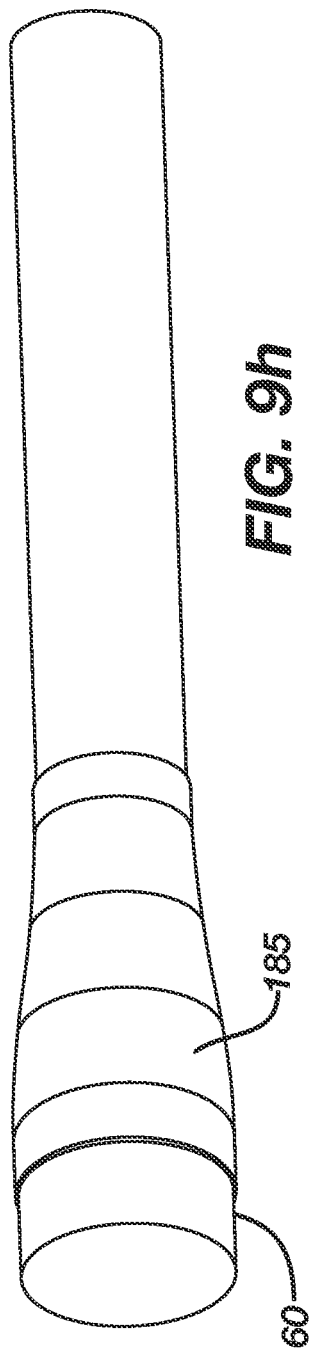
Figure 9I:
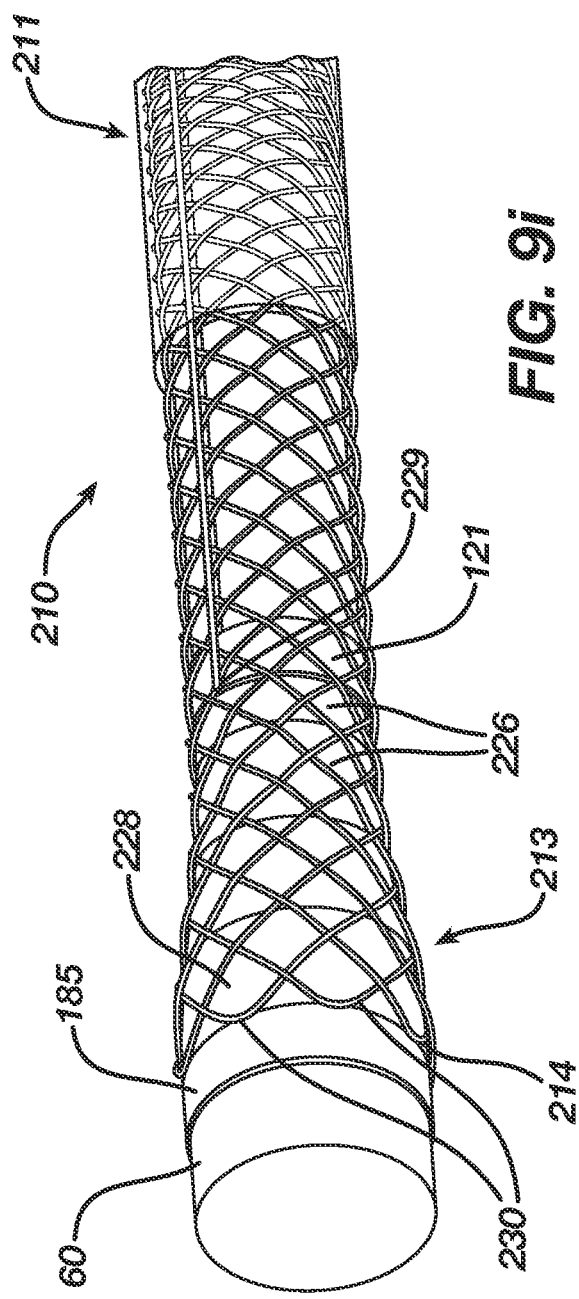
Figure 9I:
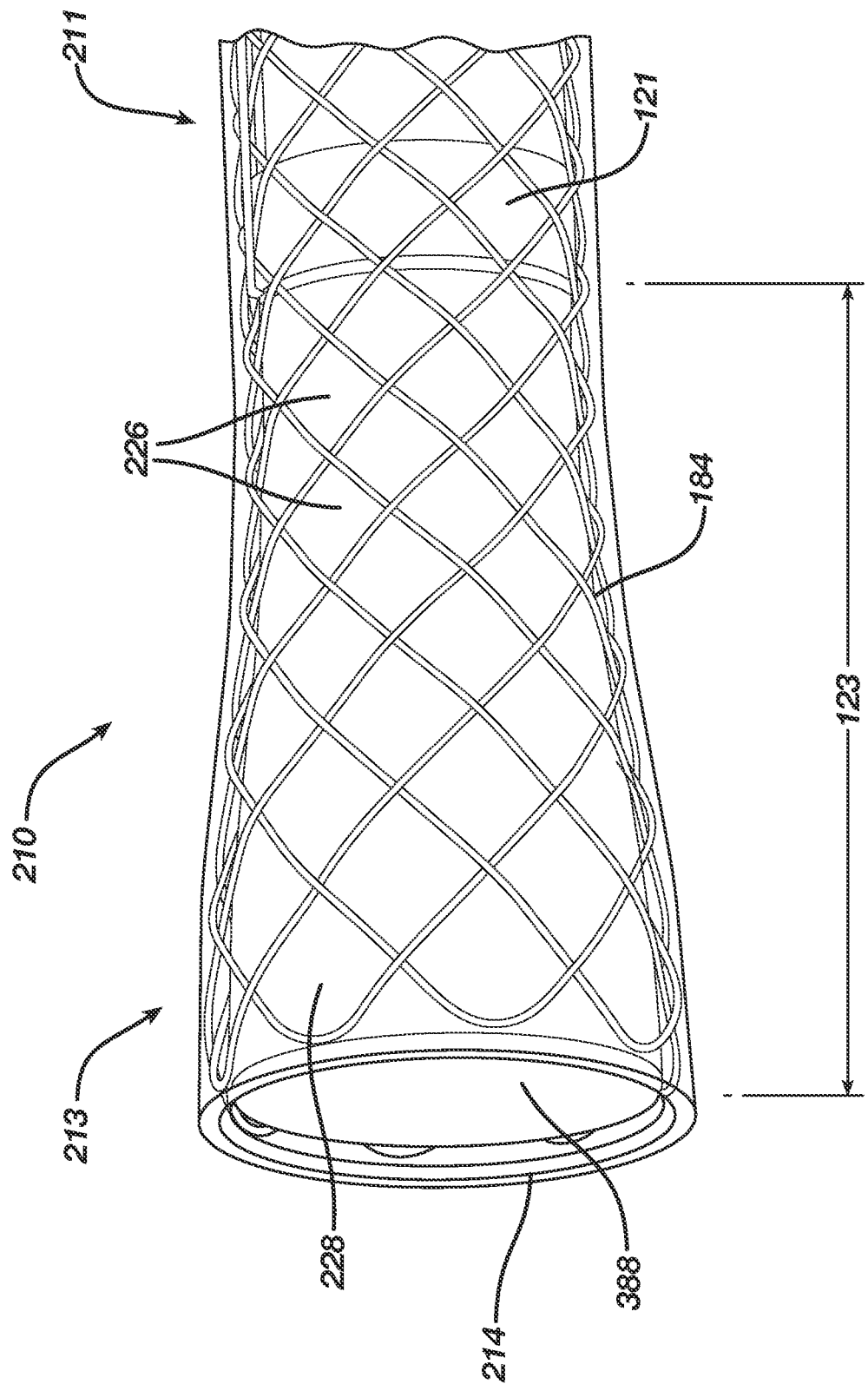
Figure 10:
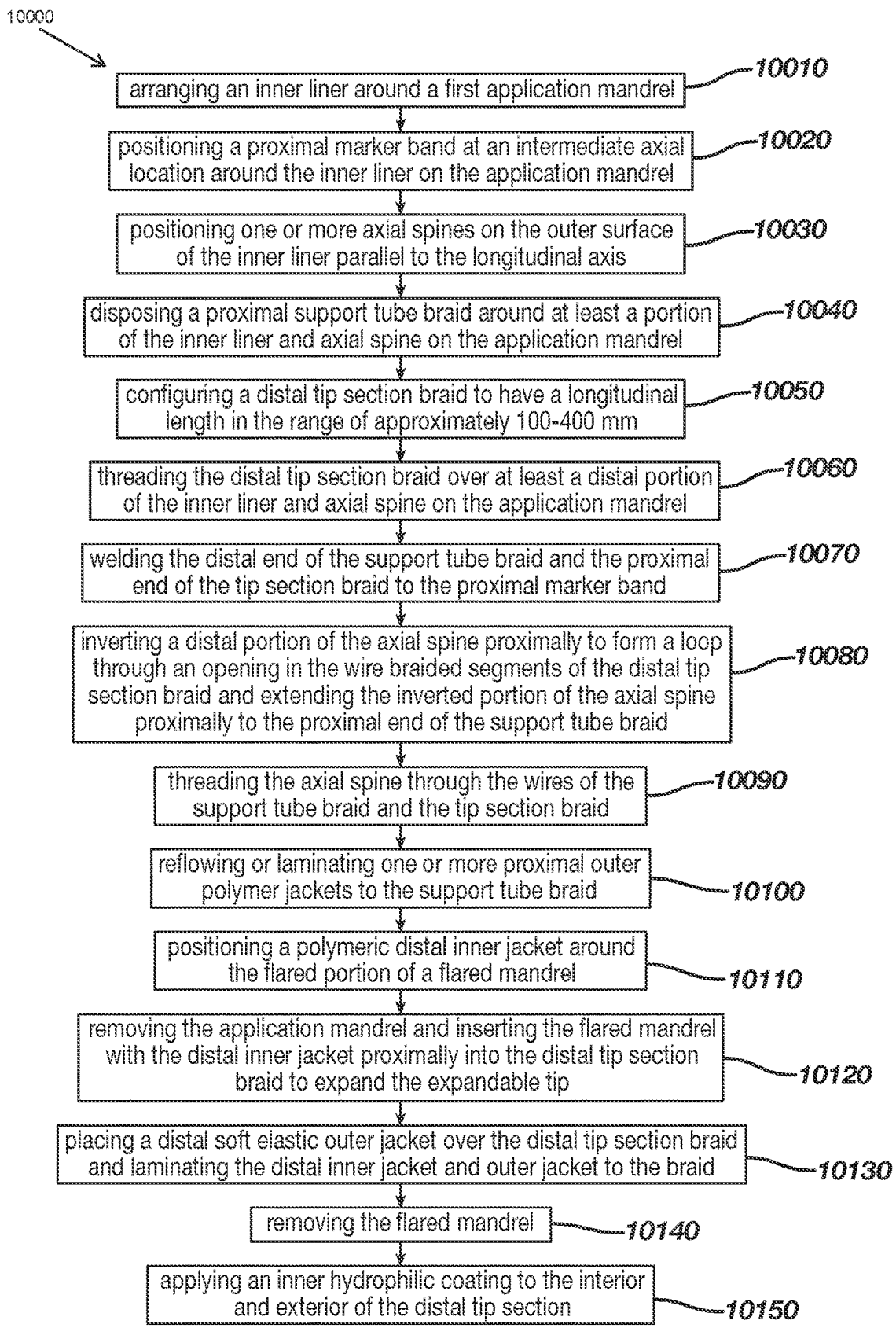
FIG. 10 is a flow diagram of the steps from FIGS. 9a-9l according to aspects of the present invention.

A method for manufacturing a catheter utilizing the disclosed designs is graphically illustrated in FIGS. 9a-9i and further shown in the flow diagram in FIG. 10. FIG. 9a shows a low friction liner 115 positioned on a supporting application mandrel 50. The mandrel can often be silver-plated copper (SPC) as is commonly used for these applications. Alternatively, especially ductile materials (such as PEEK) can be used which stretch to neck down in diameter so that the mandrel can be removed after completion of the catheter assembly. Further mandrel materials can include nylon coated copper or nylon coated steel.

The inner liner 115 can be a lubricious, low friction material such as film cast PTFE with a very low wall thickness (0.00075 inches or more preferably 0.0003 inches) and include thin outer tie layers to help with bonding. The liner can aid in a clot being pulled proximally through the catheter with aspiration and/or a clot retrieval device such as a stentriever. The liner can also help with the initial delivery of any associated devices to the target site through the lumen of the catheter. Depending on the material chosen, it can also be stretched to alter the directionality of the liner material (e.g. if the liner material has fibers, an imposed stretch can change a nominally isotropic sleeve into a more anisotropic, longitudinally oriented composition) to reduce the wall thickness as required. The liner can alternatively be of a wrapped ePTFE structure with high tensile strength to improve the integrity of the assembly and reducing tensile elongation to prevent delamination of the liner while maintaining adequate lateral flexibility.

In another embodiment, an elastomeric liner may be used that is impregnated with low friction fillers, which can enhance lateral flexibility and allow the shaft to stretch to a degree without plastically deforming. The stretch can reduce the likelihood of delamination as the liner will expand with the elastomeric outer jackets as the shaft is subjected to tensile loads and also as the shaft navigates tortuous bends (when in tortuous bends, the inner bend radius defined by the catheter is in compression while the outer bend radius of the catheter is in tension). Multiple liners may also be utilized to achieve different properties, for example, a liner with high tensile strength may be used for the majority of the shaft and span across the joint between the proximal and distal braids, while the distal end of the shaft near the funnel tip may use an elastomeric liner to improve lateral flexibility.

An axial spine 117 can be positioned along the tie layer or above an etched liner surface beneath the braid to counteract any tensile elongation of the shaft. The spine can be of a threaded formulation such as Zylon or another LCP so that it is not stiff in compression and can be flattened beneath the braid for a reduced cross sectional profile. A liquid crystal polymer can offer the highest tensile strength, while a stainless steel spine or Nitinol can offer the best pushability at the cost of some lateral flexibility. As another option, some of the LCP spine can be replaced with a stainless steel and/or Nitinol spine. In a further embodiment, Aramid fibers can be used as the spine.

Initially, a length of the spine can extend distally well beyond the distal ends of the inner liner and application mandrel to aid with further assembly steps during manufacturing. Other examples can use additional spines, such as two spines spaced 180 degrees apart, for added tensile strength.

An elongate body support tube 110 with a braided backbone 120 is positioned around at least a proximal portion of the inner liner 115 and application mandrel 50 in FIG. 9b. The braids can extend distally from a luer on the proximal end of the catheter to overlap with a radiopaque proximal marker band 118 positioned proximal to the distal end of the inner liner 115. A distal marker band (see FIG. 9f) can also be crimped into place at or near the distal end of the inner liner before or after application of the spine.

A braided tip section 210 is threaded proximally over the application mandrel 50 and inner liner 115 using the distal portion of the spine 117 as a guide, as illustrated in FIG. 9c. In some examples, the tip section 210 can be formed from wires of Nitinol or another shape memory superelastic alloy so that the solid state phase transformations can be designed to dictate the unconstrained size of the tip when it is deployed from the distal end of a guide sheath. The tip section can have at least a proximal tubular portion with a nominal inner diameter roughly the same size as the elongate body, but the braid can be compressed to expand over the liner and overlap with the marker band 118 during assembly. Alternatively, the braid can be made to have a minimum clearance of 0.0005" over the diameter of the max liner OD.

The distalmost braid pattern 122 of the plurality of braids 120 around the elongate body 110 can overlap with the marker band 118 at their distal end 114. Similarly, the most proximal braid pattern 222 of the tip section braids 220 can overlap at their proximal end 212 with the band 118. Both overlapping braids can be disposed over the spine 117 and welded to the marker band 118, as depicted in FIG. 9d. In some instances, the braided sections can be woven together for additional strength prior to being welded. Alternately, the braided sections could be welded together directly, or incased in a more proximal (approximately 200 mm to 300 mm proximal of the tip) polymer jacket of high tensile strength. This jacket can be, for example, PEBAX® 25D or up to PEBAX® 72D depending on the desired final stiffness of the catheter. The joint may also be strengthened by placing it over liners with high tensile strength, such as JUNKOSHA™ wrapped ePTFE liners.

Though the proximal braid 120 of the elongate body 110 can also be produced from Nitinol, the use of a mid-joint for the braids at the marker band 118 allows it to be manufactured from stainless steel for increased axial stiffness and reduced cost. This gives the advantage of allowing more complex design features in the distal Nitinol braid of the tip section 210 to join with lower cost standard proximal braid and/or coil sections at the marker band 118, as seen in the longitudinal section in FIG. 9d and the cross section in FIG. 9e. This flexibility increases manufacturing yields through the separation of complex and standard catheter shaft sections. The use of specific metallics such as platinum (which can be welded to both stainless steel and Nitinol) for the sleeve of the marker band 118 can replace the use of adhesives or other means and create a more robust joint. The band can be kept relatively short, for example between 0.3-1.0 mm, in order to minimize the impact on shaft flexibility.

The axial thread of the spine 117 can be pulled through a distal braid opening of the tip section 210 and looped proximally to connect the spine more securely to the distal region of the catheter. The loop 229 can create both an outboard spine portion 251 extending atop the braid pattern 222 and an inboard spine portion 252 running beneath the braid (FIG. 9e). The loop can be positioned more proximally, such as at the distal end 119 of the inner liner 115 as seen in FIG. 9f. Alternatively, the loop 229 can be at a more distal location up to or through the distalmost cells 228 of the tip section 210. The distance for which the spine 117 is looped back on itself can be kept short (<5 mm) or can be a much greater distance of approximately 50 mm. In many examples, after inverting at the loop 229 the spine 117 can return all the way to the proximal end of the catheter shaft. In another embodiment, the spine need only extend as far as the joint between the proximal and distal braids.

FIG. 9g shows that once the spine has been looped back, an axial series of separate outer polymer jacket extrusions 160 can be reflowed or laminated in place on the elongate body 110. The applied heat can allow the outer polymer to fill the interstitial sites between the braid of the elongate body and around the spine 117. This flow can also help to fix the jackets axially so they cannot slide distally. Depending on their axial location on the elongate body 110, the jackets 160 can alternately be sprayed, dipped, electro spun, and/or plasma deposited.

Suitable jacket materials can include thermoplastic elastomers like those of the PEBAX® family which can have a wide range of mechanical and dynamic properties. The jackets 160 can have differing durometer hardness and/or wall thicknesses. For example, a stiffer more proximal portion of the shaft can have a jacket with a thickness of approximately 0.004 inches and a hardness of around 72D. By contrast, a distal section requiring greater flexibility but where the underlying support braid is less dense can have a jacket with a wall thickness in the region of 0.003 inches and a hardness of around 40A. The jacket thickness can be optimized to fill the space between the liner and the braid to achieve a minimum wall thickness above the braid of 0.0005 inches to ensure there is no exposed braid.

FIG. 9h depicts a flared mandrel 60 with a NEUSOFT™ inner liner 185 applied over at least the stepped portion of the mandrel. In FIG. 9i, the application mandrel 50 can be removed and the flared mandrel 60 with the inner jacket 185 loaded proximally into the distal end 214 of the assembly. The inner jacket 185 has a hydrophilic coating 388 and a length 123. A soft, elastic outer polymer tip jacket 184 extrusion can be threaded or stretched over the flared mandrel tool 60 and pushed over the flared section to expand the undersized material of the extrusion (FIG. 9j). Alternatively, the jacket 184 material can be sized to fit over the stepped portion of the mandrel 60. FIG. 9k illustrates the outer jacket 184 and inner jacket 185 reflowed to the tip section.

In some instances, a temporary sleeve of PTFE/FEP or other suitable low friction material can be applied over the reflow mandrel and used to control and arrest the distal flow of the distal tip jacket 184 as it is reflowed into place. Typically, a layer of heat shrink can be positioned around the jacket 184 extrusion to better conform the material to the contours of the stepped mandrel during reflow or lamination. The heat shrink pushes the melted material into the braid and does not stick to the jackets allowing removal after reflow. Once complete, flared mandrel 60 can be removed from the assembly, and if necessary, any excess material can be trimmed away to ensure the desired catheter profile is attained. The trimmed tip may then be subjected to a tipping process to apply a chamfer or fillet to the jacket material for a more atraumatic finish. When removed at least the distal outer 20 cm of the distal tip section of the catheter can be coated with a hydrophilic coating.

A similar process is outlined in the method flow diagram in FIG. 10. The method steps can be implemented for any of the example devices or suitable alternatives described herein and known to one of ordinary skill in the art. The method can have some or all the steps described, and in many cases, steps can be performed in a different order than that disclosed below.

Referring to FIG. 10, the method 10000 can have the step 10010 of arranging an inner liner around a first application mandrel. The mandrel can be used to give structure during manufacturing and define what can be the inner lumen of the catheter. As an examples, a nominal 6 Fr size catheter shaft can use an application mandrel with an outer diameter of approximately 0.071 inches, and the inner liner can be approximately 0.005 inches in thickness. The mandrel can be silver-plated copper (SPC) or other commonly used materials and sized to have an outer diameter such that the resulting catheter has a bore larger than many contemporary aspiration catheters (at least 0.070 inches). The liner can be etched PTFE or a similar low friction material. A strike layer can also be included to better adhere the inner liner to subsequent layers of the catheter shaft.

Step 10020 can then involve positioning a radiopaque proximal marker band at an intermediate location between the proximal and distal ends of the inner liner on the application mandrel. For common catheters of 1320 mm final length, the location can be in a range from approximately 100 mm to approximately 400 mm from the distal end of the inner liner. For procedures and applications where less tortuosity for the catheter is expected, a more proximal marker band location at approximately 400 mm can yield a stronger overall catheter joint as a stiffer outer jacket can be used for reinforcement. Step 10030 can then involve positioning one or more axial spines on the outer surface of the inner liner (on the strike layer) parallel to the longitudinal axis. The spines can pass over or beneath the proximal marker band.

Step 10040 can include placing a proximal support tube braid around at least a proximal portion of the inner liner and axial spine on the application mandrel. This braid can be the reinforcing structure for most of the catheter shaft. The pattern can utilize 16 wires in a one wire over two under two herringbone pattern for enhanced column stiffness and kink resistance. Other patterns can also be contemplated for varying requirements of the catheter design.

A distal tip section can have a plurality of braided segments configured to allow radial expansion of the braid when a stiff clot is ingested (step 10050). This can be accomplished by varying the PPI and/or angle of the braid cells throughout a chosen distal length of the section. At least a portion of the tip can be manufactured from Nitinol or another shape memory superelastic material so that it can be collapsed within an outer sheath for delivery, but heat set to expand to a larger radial size when deployed from the distal end of the sheath. The length of the tip section can be kept relatively short, such as 100 mm, for greater pushability. Alternatively, the length can be increased to up to 400 mm for greater flexibility in reaching more distal portions of the vasculature.

In step 10060 the distal tip section can be threaded proximally onto at least a distal portion of the inner liner and axial spine on the application mandrel. The distal end of the support tube braid and the proximal end of the tip section braid can then be welded to the proximal marker band to fix the joint between the proximal support tube braid and the braid of the distal tip section in step 10070.

For step 10080, the spine thread can be pulled through an opening in one of the cells of the distal braid of the tip section to aid in connecting the thread to the distal end. The end can be pulled proximally for a few millimeters, all the way to the proximal end of the support tube braid, or some distance in between. The cell where the spine is inverted to form the loop can be one of the distalmost cells of the tip section braid, or a more proximal location such as the distal end of the inner liner. In step 10090, the end of the spine can lie over the braids, under the braids, or be woven through the braid cells as it extends proximally.

A series of outer polymer jackets of varying durometer hardness can then be reflowed to the support tube (step 10100). The jackets can preferably be in an axial series, but some combination of axial and radial series can be used. The flow of the jacket materials can allow them to encapsulate the braids of the elongate body and bond with the inner liner.

To form the distal jacket around the expandable tip, a polymeric distal inner jacket is first positioned around the flared portion of a flared mandrel in step 10110. The supporting braided frame of the distal tip section braid can allow very soft jacket materials to be used here for their atraumatic properties, such as NEUSOFT™ with a hardness of 40A to 80A. The inner jacket can be thin (e.g. approximately 0.003 inches) and is used to gain more uniform wall thickness for the tip section and ensure complete encapsulation of the braids so the lumen is smooth and unobstructed. The method can then remove the application mandrel and insert the flared mandrel with the distal inner jacket proximally into the distal tip section braid to expand the distal tip in step 10120.

Step 10130 can then involve loading or stretching a soft distal polymeric outer jacket over the expanded braided tip on the flared mandrel. Like the distal inner jacket, the distal outer jacket can be a thin NEUSOFT™ layer that can be laminated or reflowed to fuse with the inner jacket such that the final wall thickness of the combined distal polymeric jacket is approximately 0.006 inches, maintaining at least 0.0005 inches of jacket material above and below the braid surfaces. The jacket can extend proximally to the distal edge of the proximal outer jackets of the elongate body and overhang at least several millimeters distally beyond the distal end of the braid hoops of the distal tip braid. Once the jacket is applied the flared mandrel can be removed from the assembly in step 10140.

If desired, a hydrophilic coating can be applied to the outer surface of the distal tip in step 10150. A process such as dip coating can be used to apply the coating to both the inner and outer surfaces after removal of the flared mandrel. In most cases the coating can cover at least the distal most 20 cm of the catheter. In some cases, the hydrophilic coating can also be applied to the inner surface of the tip where there is no PTFE liner. Further post-processing, such as reflow and compression/injection moulding steps, can also be used to apply additional material or flow existing material to add features to the expandable tip. The features can be, for example, a disk extension, a polymeric lip, or axial ribs.

When using a catheter of the present disclosure to clear an occlusion from a body vessel, the super-bore catheter with expandable/collapsible tip can be delivered through an outer catheter or sheath to a location proximal of a vessel occlusion. The outer catheter is typically placed as close to the occlusive clot as practical, but the location can depend on the destination vessel size and the relative tortuosity of the vasculature needed to reach it. For example, in the case of a middle cerebral artery occlusion, the outer catheter might be placed in the internal carotid artery proximal of the carotid siphon. If for example the target occlusion is in an M1 vessel, a typical guide or outer sheath will need to be maintained in a position well proximal of these vessel diameters.

For example, if an 8 Fr collapsible super-bore catheter with a funnel inner diameter of 0.120 inches is used to aspirate and retrieve a large clot in the Internal Carotid Artery and branches (or a 6 Fr catheter in the M1 vessels), the user then injects contrast to check vessel patency. If the user finds that some clot fragments remain in more distal vessels, the collapsible super-bore catheter can be advanced to aspirate the fragments in the more distant location. If access cannot be achieved due to tortuosity, the funnel outer diameter has reached a point where it matches the inner diameter of the vessels, or if a self-sizing funnel has reached the lower end of its vessel range, an inner catheter with a smaller diameter 6 Fr (or 5 fr) low shear tip can be rapidly advanced telescopically to the more distal vessel location to retrieve the clot through aspiration or co-aspiration with a stent retriever. As the inner catheter and clot is retracted through the super-bore catheter, the plunger-type suction effect of retracting one within the other can act to aspirate through the mouth of the super-bore catheter to ensure that any fragments that may have dislodged from the initial clot retrieval process are retrieved. Aspiration can also be directly applied to the lumen of the super-bore catheter so that a negative flow through it can be maintained during the procedure.

Consistent collapsibility of the expandable funnel tip is important for durability and ease of use. For example, when first loading into an outer sheath for delivery, the catheter can be advanced through a profiled introducer tool that will uniformly collapse the tip to fit inside an outer sheath such as a balloon guide catheter. The inner diameter of the collapsed tip is maintained so that smaller introducers or microcraters and guidewires can be advanced through it. This is advantageous when using a telescoping approach to reach a target vessel location. Telescoping allows the user to first advance a smaller more trackable catheter to the treatment location and then advance a larger catheter over it, using the smaller catheter/guidewire as a rail to guide advancement of the larger catheter. An alternative can be to advance a smaller fixed mouth catheter through the expandable tip catheter if vessel size prohibits its further advancement. The larger sized catheter can then act as a backup for retracting the smaller diameter catheter should a stiff clot become lodged in the shaft of the smaller catheter.

As another option, a loading tool can be supplied on the shaft of the catheter so that it is advanced distally over the funnel of the expandable tip to collapse the tip before inserting through the luer of an outer guide sheath. In another similar example, a split tool can be used to collapse the funnel through stretching. The tool halves can be joined together using thread locks, snap locks or with magnetic fastening features. This allows the user to attach, remove and reattach the tool as needed, for example, if the physician needs to do a second pass with the same catheter, the tool can be reattached to allow collapse of the flared tip for a second advancement through an outer guide after a first pass has been completed.

Once the target is reached, the occlusion can be aspirated and drawn into the tip and lumen of the expandable tip large bore catheter, or a smaller telescoping inner catheters where used, with the help of aspiration through one or multiple of the catheters in the system. If necessary, auxiliary devices such as microcatheters and clot retrieval devices can be advanced through the lumen of the large bore catheter and used against obstinate clots.

Once the clot has been dislodged from the vessel walls it can be progressively compressed through the funnel-shape of the expandable tip of the large bore catheter and through the lumen into a canister or syringe. For a particularly firm clot, additional radial expansion of the tip section can protect and shelter a lodged clot while the catheter itself is withdrawn. Otherwise, the catheters can remain in position during this step to maintain access to the target site. Contrast can then be injected to determine the extent to which the vessel is patent. Clot retrieval devices may be rinsed in saline and gently cleaned before being reloaded into the microcatheter for additional passes, if required. When the vessel has been satisfactorily cleared, the catheter can be retracted to collapse the expandable tip within the outer catheter.

The invention is not necessarily limited to the examples described, which can be varied in construction and detail. The terms "distal" and "proximal" are used throughout the preceding description and are meant to refer to a positions and directions relative to a treating physician. As such, "distal" or distally" refer to a position distant to or a direction away from the physician. Similarly, "proximal" or "proximally" refer to a position near or a direction towards the physician. Furthermore, the singular forms "a," "an," and "the" include plural referents unless the context clearly dictates otherwise.

As used herein, the terms "about" or "approximately" for any numerical values or ranges indicate a suitable dimensional tolerance that allows the part or collection of components to function for its intended purpose as described herein. More specifically, "about" or "approximately" may refer to the range of values±20% of the recited value, e.g. "about 90%" may refer to the range of values from 71% to 99%.

In describing example embodiments, terminology has been resorted to for the sake of clarity. As a result, not all possible combinations have been listed, and such variants are often apparent to those of skill in the art and are intended to be within the scope of the claims which follow. It is intended that each term contemplates its broadest meaning as understood by those skilled in the art and includes all technical equivalents that operate in a similar manner to accomplish a similar purpose without departing from the scope and spirit of the invention. It is also to be understood that the mention of one or more steps of a method does not preclude the presence of additional method steps or intervening method steps between those steps expressly identified. Similarly, some steps of a method can be performed in a different order than those described herein without departing from the scope of the disclosed technology.

What is claimed is:

1. A catheter comprising:
    an inner liner having a proximal end, a distal end and a lumen extending from the proximal end to the distal end along a longitudinal axis;
    a wire braid disposed about the inner liner, the wire braid having a proximal end and a distal end, the wire braid comprising hoops at the distal end where the wire braid inverts back proximally through the wire braid; and
    at least one polymer body jacket disposed about the wire braid and the inner liner, the at least one polymer body jacket having a proximal end and a distal end;
    wherein the catheter is movable between a delivery configuration having a substantially tubular shape in a constrained state and a deployed configuration having a proximal tubular shape and a distal funnel shaped portion in an unconstrained state; the distal funnel shaped portion being self-expandable and having a proximal end adjacent to the proximal tubular shaped portion and a distal end terminating at a distal end of catheter, the distal funnel shaped portion continuously tapering from a first diameter at its proximal end to a second larger diameter at its distal end;
    wherein the distal end of the wire braid is spaced proximally from the distal end of the at least one polymer body jacket by a predetermined distance.

2. The catheter of claim 1, wherein the distal end of the wire braid is spaced from the distal end of the at least one polymer body jacket by about 0.1 mm to about 1.0 mm.

3. The catheter of claim 2, wherein the distal end of the wire braid is spaced from the distal end of the at least one polymer body jacket by about 0.5 mm to about 0.8 mm.

4. The catheter of claim 1, wherein the distal funnel shaped portion has an axial length of about 5.0 mm to about 10.0 mm.

5. The catheter of claim 4, wherein the distal funnel shaped portion has an axial length of about 1.0 mm to about 5.0 mm.

6. The catheter of claim 1, wherein a distal most polymer body jacket of the at least one polymer body jackets has an axial length of about 90 mm.

7. The catheter of claim 1, wherein a distal most polymer body jacket of the at least one polymer body jackets has a Shore A hardness of about 62.

8. The catheter of claim 7, wherein a distal most polymer body jacket of the at least one polymer body jackets has a Shore A hardness of about 42.

9. The catheter of claim 1, wherein the inner liner has a distal end that is spaced proximally from the from the distal end of the catheter.

10. The catheter of claim 1, wherein the catheter is configured to be advanced within a target blood vessel with the distal funnel shaped portion in the unconstrained state.

11. The catheter of claim 1, wherein a ratio of the inner diameter of the proximal tubular shaped portion to the expanded inner diameter of the distal funnel shaped portion in the deployed configuration in the unconstrained state being in a range from approximately 0.55 to approximately 0.90.

12. The catheter of claim 11, wherein the inner diameter of the proximal tubular shaped portion is approximately 0.054 inches, and an inner diameter of the distal funnel shaped portion is approximately 0.068 inches to approximately 0.090 inches.

13. The catheter of claim 11, wherein the inner diameter of the proximal tubular shaped portion is approximately 0.068 inches to approximately 0.074 inches, and an inner diameter of the distal funnel shaped portion is approximately 0.090 inches to approximately 0.120 inches.

14. The catheter of claim 11, wherein the inner diameter of the proximal tubular shaped portion is approximately 0.082 inches to approximately 0.095 inches, and an inner diameter of the distal funnel shaped portion is approximately 0.090 inches to approximately 0.188 inches.

15. The catheter of claim 2, wherein a ratio of the distance between the distal end of the wire braid and the distal end of the at least one polymer body jacket to an axial length of the distal funnel shaped portion is between 50:1 and 10:1.

16. The catheter of claim 2, wherein a ratio of the distance between the distal end of the wire braid and the distal end of the at least one polymer body jacket to an axial length of the distal funnel shaped portion is between 10:1 and 5:1.

17. The catheter of claim 3, wherein a ratio of the distance between the distal end of the wire braid and the distal end of the at least one polymer body jacket to an axial length of the distal funnel shaped portion is between 10:1 and 12.5:1.

18. The catheter of claim 3, wherein a ratio of the distance between the distal end of the wire braid and the distal end of the at least one polymer body jacket to an axial length of the distal funnel shaped portion is between 2:1 and 6.25:1.

\* \* \* \* \*